United States Patent
Chen et al.

(10) Patent No.: US 12,530,816 B2
(45) Date of Patent: Jan. 20, 2026

(54) VIDEO PROCESSING METHOD, VIDEO PROCESSING APPARATUS, ELECTRONIC DEVICE AND COMPUTER READABLE STORAGE MEDIUM

(71) Applicant: BOE TECHNOLOGY GROUP CO., LTD., Beijing (CN)

(72) Inventors: Guannan Chen, Beijing (CN); Dan Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 371 days.

(21) Appl. No.: 18/027,959

(22) PCT Filed: Mar. 25, 2022

(86) PCT No.: PCT/CN2022/083016
§ 371 (c)(1),
(2) Date: Mar. 23, 2023

(87) PCT Pub. No.: WO2023/178648
PCT Pub. Date: Sep. 28, 2023

(65) Prior Publication Data
US 2024/0320796 A1    Sep. 26, 2024

(51) Int. Cl.
*G06T 11/00* (2006.01)
*G06T 5/20* (2006.01)
(Continued)

(52) U.S. Cl.
CPC ............... *G06T 11/00* (2013.01); *G06T 5/20* (2013.01); *G06T 5/50* (2013.01); *G06T 5/60* (2024.01);
(Continued)

(58) Field of Classification Search
CPC .... G06T 5/60; G06T 5/20; G06T 5/50; G06T 2207/10016; G06T 2207/10024;
(Continued)

(56) References Cited

U.S. PATENT DOCUMENTS 10,957,086 B1 *  3/2021  Mathon et al. ......... G06T 11/60
12,217,520 B1 *  2/2025  Gangirevula et al. ......................
                                                    G06V 20/693
(Continued)

FOREIGN PATENT DOCUMENTS

CN    109257600 A    1/2019
CN    110782395 A    2/2020
(Continued)

OTHER PUBLICATIONS

"Convolutional Deep Feedforward Network for Image Classification" by Lau et al., published Jun. 1, 2019, in 2019 7th International Conference on Smart Computing & Communications (ICSCC) (2019, pp. 1-4) (Year: 2019).*

(Continued)

*Primary Examiner* — Matthew C Bella
*Assistant Examiner* — Daniel Joseph Santos
(74) *Attorney, Agent, or Firm* — HOUTTEMAN LAW LLC

(57) ABSTRACT

The present disclosure relates to a video processing method, a video processing apparatus, an electronic device, and a storage medium, where the video processing method includes: acquiring a video frame of a video to be processed; and performing color adjustment on the video frame using at least one color enhancement model in a color enhancement model pool, to obtain an video output frame subjected to color adjustment, where the color enhancement model pool includes a set of models for performing the color adjustment (Continued)

on videos of a plurality of video content types with different requirements on styles thereof.

19 Claims, 8 Drawing Sheets

(51) Int. Cl.
| | | |
|---|---|---|
| *G06T 5/50* | (2006.01) | |
| *G06T 5/60* | (2024.01) | |
| *G06V 10/44* | (2022.01) | |
| *G06V 10/77* | (2022.01) | |
| *G06V 10/80* | (2022.01) | |
| *G06V 10/82* | (2022.01) | |

(52) U.S. Cl.
CPC ........ *G06V 10/443* (2022.01); *G06V 10/7715* (2022.01); *G06V 10/806* (2022.01); *G06V 10/82* (2022.01); *G06T 2207/10016* (2013.01); *G06T 2207/10024* (2013.01); *G06T 2207/20081* (2013.01); *G06T 2207/20084* (2013.01)

(58) Field of Classification Search
CPC ........... G06T 2207/20081; G06T 2207/20084; G06T 11/00; G06T 7/90; G06T 11/001; G06T 5/90; G06T 3/4053; G06T 3/04; G06T 5/73; G06V 10/443; G06V 10/7715; G06V 10/806; G06V 10/82; G06V 20/41; G06F 18/214
USPC .......................................................... 382/157
See application file for complete search history.

(56) References Cited

U.S. PATENT DOCUMENTS

| | | |
|---|---|---|
| 2021/0067735 A1 | 3/2021 | Reda et al. |
| 2021/0233259 A1* | 7/2021 | Wang et al. ............ G06T 7/262 |
| 2022/0125337 A1* | 4/2022 | Assouline et al. .... A61B 5/1113 |
| 2023/0267706 A1* | 8/2023 | Djelouah et al. .... G06V 10/771 |

FOREIGN PATENT DOCUMENTS

| | | | |
|---|---|---|---|
| CN | 111031346 A | | 4/2020 |
| CN | 111784598 A | * | 10/2020 |
| CN | 111951168 A | | 11/2020 |
| CN | 112070664 A | | 12/2020 |
| CN | 113034384 A | | 6/2021 |
| CN | 113228660 A | | 8/2021 |
| CN | 113298740 A | | 8/2021 |
| CN | 113313650 A | | 8/2021 |
| CN | 113780252 A | | 12/2021 |
| CN | 114303160 A | | 4/2022 |
| WO | WO2022027197 A1 | | 2/2022 |

OTHER PUBLICATIONS

China Patent Office, First Office Action, Jun. 23, 2025, for corresponding CN application No. 202280000545.5.

Yang, Deyun, "Research on Infrared Guided Low-light Image Enhancement Technology Based on Deep Learning," Master's Dissertation, Anhui University, May 5, 2020, Anhui, China.

* cited by examiner

VIDEO PROCESSING METHOD, VIDEO PROCESSING APPARATUS, ELECTRONIC DEVICE AND COMPUTER READABLE STORAGE MEDIUM

TECHNICAL FIELD

The present disclosure relates to the field of image processing technology and artificial intelligence, and in particular, to a video processing method, a video processing apparatus, an electronic device, and a computer readable storage medium.

BACKGROUND

Color enhancement is an important technology in the field of image processing. The technology enables image to be richer and more vivid by adjusting the color of pictures and videos, so that the quality of the video images is greatly improved. The technology can be applied to computer vision scenes such as video color creation, image quality enhancement of film sources, and the like.

SUMMARY

The embodiments of present disclosure provide a video processing method, a video processing apparatus, an electronic device, and a computer readable storage medium.

In a first aspect, an embodiment of the present disclosure provides a video processing method, including: acquiring a video frame of a video to be processed; and performing color adjustment on the video frame using at least one color enhancement model in a color enhancement model pool, to obtain an video output frame subjected to color adjustment, wherein the color enhancement model pool includes a set of models for performing the color adjustment on videos of a plurality of video content types with different requirements on styles thereof.

The performing color adjustment on the video frame using at least one color enhancement model in a color enhancement model pool, to obtain an video output frame subjected to color adjustment, includes:
receiving information including the video content type and the requirement on style of the video frame: selecting a color enhancement model corresponding to the video content type and the requirement on style from the color enhancement model pool; and processing the video frame using the selected color enhancement model, to obtain the video output frame subjected to color adjustment.

The performing color adjustment on the video frame using at least one color enhancement model in a color enhancement model pool, to obtain an video output frame subjected to color adjustment, includes: processing the video frame using each color enhancement model in the color enhancement model pool, to obtain the video frame subjected to color adjustment output by this color enhancement model: processing the video frame based on a content analysis model, to generate a weight of each color enhancement model corresponding to the video frame: wherein the content analysis model is configured to determine a weight of each color enhancement model in the color enhancement model pool according to the video frame; and performing weighted fusion processing on the video frames subjected to color adjustment output by all the color enhancement models, using the weights of all the color enhancement models corresponding to the video frame, to generate the video output frame.

The color enhancement model includes an image reconstruction branch model and a color enhancement branch model; and the processing the video frame using the selected color enhancement model, to obtain the video output frame subjected to color adjustment, includes:
performing feature extraction on the video frame, to obtain a first image feature; filtering the video frame, and performing feature extraction on the filtered video frame, to obtain a second image feature: inputting the first image feature into the image reconstruction branch model, and inputting the second image feature into the color enhancement branch model, to perform image reconstruction and color adjustment according to the first image feature and the second image feature: performing feature fusion processing on an output result of the image reconstruction branch model and an output result of the color enhancement branch model, to obtain a fusion result; and generating the video output frame subjected to color adjustment, according to the fusion result.

Each of the image reconstruction branch model and the color enhancement branch model includes N number of residual dense blocks (RDBs); the color enhancement model further includes N number of fully connected layers: wherein N is an integer greater than or equal to 1; and the inputting the first image feature into the image reconstruction branch model, and inputting the second image feature into the color enhancement branch model, to perform image reconstruction and color adjustment according to the first image feature and the second image feature, includes:
acquiring a first RDB in the image reconstruction branch model and a first RDB in the color enhancement branch model, as a current RDB of a first branch model and a current RDB of a second branch model, respectively: processing the first image feature through the current RDB of the first branch model, and processing the second image feature through the current RDB of the second branch model, to obtain a feature map output by the current RDB of the first branch model and a low frequency color feature output by the current RDB of the second branch model: processing the low frequency color feature output by the current RDB of the second branch model through a corresponding one of the N number of fully connected layers, to obtain a feature vector, and correspondingly multiplying the feature vector by the feature map output by the current RDB of the first branch model, to obtain a feature map subjected to local color feature adjustment: taking the feature map subjected to local color feature adjustment as a new first image feature, and taking the low frequency color feature output by the current RDB of the second branch model as a new second image feature; and acquiring a next RDB in the image reconstruction branch model and a next RDB in the color enhancement branch model as a new current RDB of the first branch model and a new current RDB of the second branch model, respectively, until the number of acquiring times is equal to N, taking the newly obtained feature map subjected to local color feature adjustment as an output result of the image reconstruction branch model, and taking the newly acquired low frequency color feature as an output result of the color enhancement branch model.

The RDB includes a DenseNet and a local feature fusion layer: the local feature fusion layer is configured to perform feature addition on an input feature to the RDB and an output feature of the DenseNet using local residual learning, to obtain an output feature of the RDB: the DenseNet includes M number of dense blocks and one connection block, wherein M is an integer greater than or equal to 1;

an input to a first dense block is the input feature to the RDB: an input feature to the $i^{th}$ dense block is the input feature to the RDB and output features of all dense blocks before the $i^{th}$ dense block, wherein i is an integer greater than 1 and less than or equal to M; and an input to the connection block is the input feature to the RDB and the output features of the M number of dense blocks.

Each color enhancement model in the color enhancement model pool has a same model structure: the color enhancement model in the color enhancement model pool is a trained color enhancement model obtained through pre-training an initial color enhancement model by adopting different color enhancement data pairs for different color styles of different video content types; and the color enhancement data pair includes: an un-toned image block and a toned image block with a same image size, selected from an un-toned image and a first toned image, respectively, at a same position in image, wherein the first toned image is an image pre-acquired by toning the un-toned image based on the color style characteristics of the un-toned image.

Training the initial color enhancement model includes: processing the un-toned image block selected from the un-toned image using the initial color enhancement model, to obtain a color adjustment result of the un-toned image block, and acquiring a toned image block corresponding to the un-toned image block from the color enhancement data pair, as a color adjustment reference result: constructing a loss function of the initial color enhancement model based on the color adjustment result and the color adjustment reference result: adjusting model parameters of the initial color enhancement model using the loss function of the initial color enhancement model, to obtain an updated color enhancement model; and taking the updated color enhancement model as a new initial color enhancement model, and processing the un-toned image block selected from the un-toned image using the new initial color enhancement model, until the training process of the initial color enhancement model meets a first training end condition, to obtain the trained color enhancement model: wherein the first training end condition includes at least one of the following conditions that a training loss calculated according to the loss function of the initial color enhancement model is less than or equal to a set first loss threshold, or the number of training times of the initial color enhancement model reaches a set first threshold of number of times.

The constructing a loss function of the initial color enhancement model based on the color adjustment result and the color adjustment reference result, includes: calculating a minimum square error between the color adjustment result and the color adjustment reference result, to obtain a minimum square error loss; calculating a Gaussian filter output result of the color adjustment result and a Gaussian filter output result of the color adjustment reference result, to obtain a color loss; and performing weighted summation on the minimized square error loss and the color loss, to generate the loss function of the initial color enhancement model.

The content analysis model includes a convolutional network of K number of stacked convolutional structures connected in sequence and two fully connected layers, each of preceding K−1 number of stacked convolutional structures includes a convolutional layer, an activation layer and a pooling layer, and a $K^{th}$ stacked convolutional structure includes a convolutional layer and an activation layer.

The content analysis model is a trained content analysis model obtained by training in advance an initial content analysis model based on each color enhancement model in a pre-trained color enhancement model pool and using image data pairs of different styles: wherein the image data pair includes an un-toned image block and a toned image block with a same image size, selected from the un-toned image and a second toned image, respectively, at a same position in image, wherein the second toned image is an image pre-acquired by toning the un-toned image based on different video content types.

The training the initial content analysis model, includes:
processing the un-toned image block selected from the un-toned image using each color enhancement model in a pre-trained color enhancement model pool, to obtain a color adjustment result of each color enhancement model on the un-toned image block; processing the un-toned image block using the initial content analysis model, to obtain a predetermined number of weights, wherein the predetermined number is the same as the number of the color enhancement models in the color enhancement model pool;
performing weighted fusion processing on the color adjustment results of all the color enhancement models on the un-toned image block, according to the predetermined number of weights, to obtain a color enhancement result of the un-toned image block, and acquiring the toned image block corresponding to the un-toned image block from the image data pair, as a color enhancement reference result: constructing a loss function of the initial content analysis model based on the color enhancement result and the color enhancement reference result of the un-toned image block: adjusting model parameters of the content analysis model using the loss function of the initial content analysis model, to obtain an updated content analysis model using the adjusted model parameters; and taking the updated content analysis model as a new initial content analysis model, and processing the un-toned image block using the new initial content analysis model, until the training process of the initial content analysis model meets a second training end condition, to obtain the trained content analysis model, wherein the second training end condition includes at least one of the following conditions that a training loss calculated according to the loss function of the initial content analysis model is less than or equal to a set second loss threshold, or the number of training times of the initial content analysis model reaches a set second threshold of number of times.

The loss function of the initial content analysis model is a loss function constructed according to the minimized square error of the color enhancement result of the un-toned image block and the color enhancement reference result.

In a second aspect, an embodiment of the present disclosure provides a video processing apparatus, including: an acquisition device configured to acquire a video frame to be processed; and a processing device configured to performing color adjustment on the video frame using at least one color enhancement model in a color enhancement model pool, to obtain an video output frame subjected to color adjustment, wherein the color enhancement model pool includes a set of models for performing the color adjustment on videos of a plurality of video content types with different requirements on styles thereof.

In a third aspect, an embodiment of the present disclosure provides an electronic device, which includes a memory, a processor, and a computer program stored in the memory and executable in the processor, and the computer program implements, when being executed by the processor, any one of the video processing methods in the embodiments of the present disclosure.

In a fourth aspect, the present disclosure provides a computer readable storage medium storing a computer program which, when being executed by a processor, implements any one of the video processing methods in the embodiments of the present disclosure.

It is to be understood that both the foregoing general description and the following detailed description are exemplary and illustrative only, and do not limit the present disclosure. Other feature and aspects of the present disclosure will become apparent from the following detailed description of exemplary embodiments with reference to the accompanying drawings.

BRIEF DESCRIPTION OF DRAWINGS

The accompanying drawings, which are included to provide a further understanding of the present disclosure and constitute a part of this specification, serve to explain the present disclosure together with the following specific embodiments, but do not constitute a limitation to the present disclosure. In the drawings.

DETAIL DESCRIPTION OF EMBODIMENTS

Figure 1:
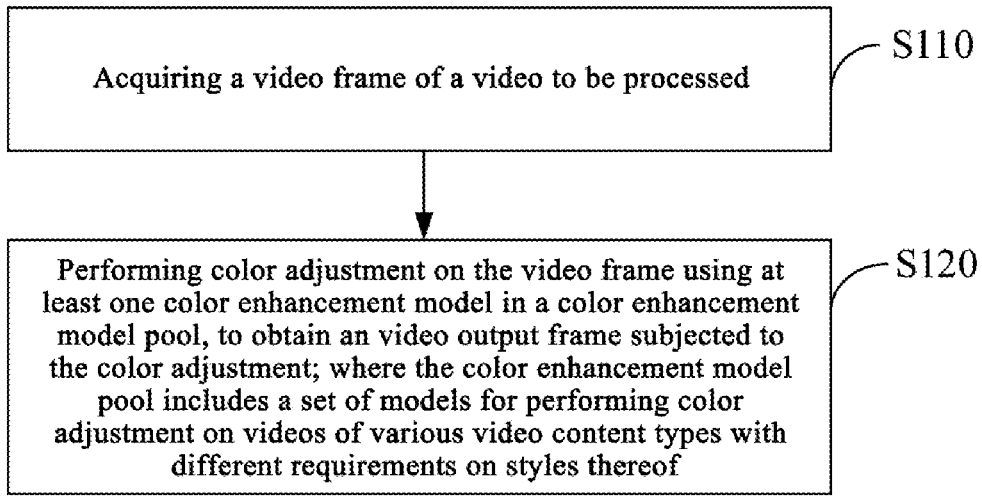
FIG. 1 is a flowchart of a video processing method in some embodiments of the present disclosure.

The embodiments of the present disclosure will be described in detail below with reference to the accompanying drawings. It should be understood that the embodiments described herein are only intended to illustrate and explain the present disclosure, but not to limit the present disclosure.

In practical application scenes, with the development of image display technologies, users have put forward higher requirements on viewing experiences, and display applications with the quality of video images enhanced, such as ultra-high definition display applications, gradually appear in life scenes. At present, the industry chain of ultra-high definition display in China also is consummated gradually. In order to obtain better quality of the video images, higher requirements are put forward on video image quality and hardware capability of a display terminal. A large number of enterprises and institutions are involved in an ultra-high definition camera at an acquisition end, a large screen with ultra-high definition resolution and a high dynamic range (HDR) television at a display end, a connection network of a new generation broadband mobile communication technology and an ultra-high definition television station at a transmission end, etc., and promote the rapid development of image quality enhancement display technology such as ultra-high definition display.

In the embodiment of the present disclosure, the resolution of the display end may include multiple display formats such as Standard Definition (SD), High Definition (HD), Full High Definition (FHD), and Ultra-high Definition (Ultra HD).

Illustratively, the standard definition resolution may be, for example, 480×320 pixels or 640×480 pixels: the high definition resolution may be, for example, 1024×720 pixels: the full definition resolution may be, for example, 1920× 1080 pixels; and the ultra-high definition resolution may be, for example, 3840×2160 pixels, that is, 3840 pixels may be displayed in a horizontal direction and 2160 pixels may be displayed in a vertical direction on the entire display screen. Since the ultra-high definition resolution may be four times of the full high definition resolution, the ultra-high definition resolution may also be referred to as 4k resolution.

Illustratively, 8k resolution may be 7680×4320 pixels, that is, 7680 pixels may be displayed in the horizontal direction and 4320 pixels may be displayed in the vertical direction on the entire display screen. In the embodiment the present disclosure, the 8k resolution may also be named ultra-high definition resolution.

For example, the connection network of the new generation broadband mobile communication technology may be a communication network of a fifth Generation Mobile Communication Technology (5G) or higher network system. With the improvement of display technology and mobile communication technology, a communication network with characteristics of high speed and low time delay provided by the new generation broadband mobile communication technology provides better support for popularization of ultra-high definition videos.

Illustratively, a dynamic range refers to a ratio of a "brightest" part to a "darkest" part in an image, that is, the number of levels of gray scale divided between the "brightest" and "darkest" parts of the image. The larger the dynamic range is, the richer the levels can be represented, and the wider the contained color space is. A high dynamic range means that the ratio of the "brightest" part to the "darkest" part can reach very high (above a predetermined threshold). By quantization of the gray scale, an image of a high dynamic range (i.e., HDR image) can provide higher dynamic range and more details in the image. The HDR television is a television capable of supporting HDR technology, and the use of the HDR technology can increase the representation of details in a picture, improve the image quality and keep the authenticity of image colors.

In some application scenes, a technology of the ultra-high definition device platform develops fast, while the production and manufacturing of the ultra-high definition video content are lagged behind. The stock of 4K/8K film sources cannot meet the demands of ultra-high definition playing, but a large amount of stock of standard definition and high definition videos cannot be played on an ultra-high definition display platform. Therefore, ultra-high definition reproduction of standard-definition and high definition film sources is the fastest and most direct means for solving the insufficiency of ultra-high definition film sources.

Since the ultra-high definition video adopts the definition of color space in the television display standard of a new generation ultra-high definition video production and display system, for example, 4K/8K video may adopt BT.2020 color gamut, and the color gamut specifies the maximum color gamut which can be achieved using three primary colors so far, so that color creation may be performed in a larger space. However, the current video color creation is usually completed manually, and the ultra-high definition reproduction of low definition film sources usually depends on manual processing and cannot be automated, so that the film sources have a long production period, a high labor cost and a low processing efficiency.

The embodiments of the present disclosure provide a video processing method, a video processing apparatus, an electronic device, and a computer readable storage medium, where the method may be executed by an electronic device such as a terminal device or a server, and the terminal device may include but is not limited to a personal computer, a smart phone, a tablet computer, a Personal Digital Assistant (PDA), a server, or the like. The video processing method may be realized by calling computer readable program instructions stored in a memory by a processor. Alternatively, the method may be performed by a server.

For a better understanding of the present disclosure, the video processing method according to the embodiment of the present disclosure will be described in detail below with reference to the accompanying drawings. It should be noted that these embodiments are not intended to limit the scope of the present disclosure.

FIG. 1 is a flowchart of a video processing method in some embodiments of the present disclosure. As shown in FIG. 1, the video processing method includes the following steps S110 and S120.

S110, acquiring a video frame of a video to be processed.

In this step, an execution device may receive the video to be processed through a communication network, read the video to be processed from an internal storage in the execution device or an external storage, obtain the video to be processed by downloading from the internet through the search engine in the execution device, obtain the video to be processed by shooting through a shooter in the execution device, such as a camera, a video camera, of the like, or acquire, from a video processing instruction, the video frame of the video to be processed carried by the instruction. It should be understood that the video to be processed in the embodiment of the present disclosure may alternatively be acquired in other manners, and the specific contents are not limited herein.

S120, performing color adjustment on the video frame using at least one color enhancement model in a color enhancement model pool, to obtain an video output frame subjected to the color adjustment.

The color enhancement model pool includes a set of models for performing color adjustment on videos of various video content types with different requirements on styles thereof.

In some embodiments, the color enhancement model pool may include at least one color enhancement model, and each color enhancement model in the color enhancement model pool may be applicable to color adjustment on the video frame of a video content type with requirements on a style thereof.

As an example, the video content types may include at least one of the following types: television series, documentary, movie, animation, sports, news, drama, entertainment, and education. In practical application scenes, the video content types may alternatively be other types, and are not limited herein.

As an example, the requirements on styles refer to requirement on style characteristics of the video to be processed. For a video of a certain video content type, a video content of the video generally has more uniform style characteristics, and the style characteristics may include at least one of the following characteristic items: painting style, image quality, color tone, and brightness.

The painting style is an integral audio-visual feeling and visual style formed for the viewer watching the video. The image quality, i.e. the quality of image, includes the indexes of definition, sharpness, lens distortion, dispersion, resolution, color gamut range, color purity (or color brilliance), color balance, etc. The color tone refers to the relative brightness and darkness of color in the image. The brightness refers to the brightness degree of the image. In practical application scenes, the style characteristics of the video content may further include other characteristic items, which are not specifically limited herein.

According to the video processing method in the embodiment of the present disclosure, the color enhancement model pool includes a set of models for adjusting videos of various video types with different requirements on styles thereof, the color adjustment is performed on the acquired video frame of the video to be processed according to at least one color enhancement model in the model pool, a color toning effect corresponding to the video content type and the requirement on style of the video frame can be automatically generated, and the video processing process can be automatically realized through calling the model by the execution device, so that video color creation can be automatically performed, ultra-high definition reproduction of low-definition film sources can be automatically completed, the film source production period can be shortened, the labor cost can be saved, and the video processing efficiency can be improved.

Figure 2:
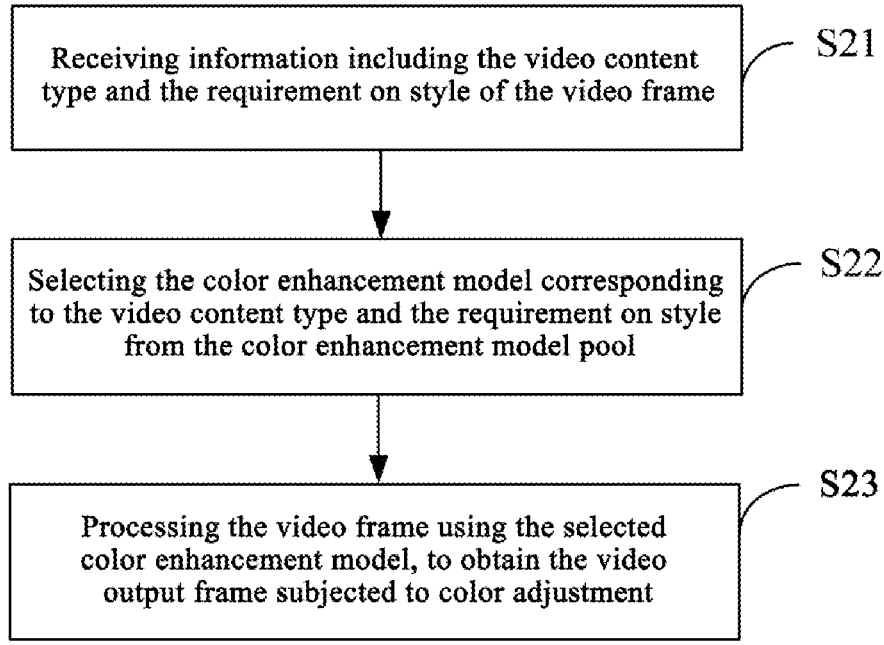
FIG. 2 is a flowchart of a color adjustment process in some embodiments of the present disclosure.

FIG. 2 is a flowchart of a color adjustment process in some embodiments of the present disclosure. As shown in FIG. 2, in some embodiments, the step S120 may specifically include the following steps S21 to S23.

S21, receiving information including the video content type and the requirement on style of the video frame.

In some embodiments, in the case that the video frame of the video to be processed is received, the information including the video content type and the requirement on style of the video frame may also be received, so as to select the corresponding model from the color enhancement model pool according to the video content type and the requirement on style. For example, the step S21 may be executed prior or subsequent to the step S110. Alternatively, the step S21 may be executed synchronously with the step S110, that is, the execution device may synchronously receive the information including the video content type and the requirement on style of the video frame, when receiving the video frame of the video to be processed. In actual application scenes, as long as the video frame of the video to be processed and the video content type and the requirement on style of the video are acquired prior to the color enhancement model is selected, the execution sequence of the steps S110 and S21 may be flexibly set according to actual needs.

S22, selecting the color enhancement model corresponding to the video content type and the requirement on style from the color enhancement model pool.

In some embodiments, different video content types may have different requirements on styles, as may requirements on styles for the same video content type. Therefore, according to the received information including the video content type and the requirement on style of the video frame, a color enhancement model matched with the video content type and the requirement on style can be selected from the color enhancement model pool.

S23, processing the video frame using the selected color enhancement model, to obtain the video output frame subjected to color adjustment.

In some embodiments, according to the received information including the video content type and the requirement on style of the video frame, the color enhancement model matched with the video content type and the requirement on style may be selected from the color enhancement model pool, and then the video frame may be processed according to the matched color enhancement model, to obtain the video output frame subjected to color adjustment.

In other embodiments, if at least two color enhancement models are selected from the color enhancement model pool, and one of the at least two color enhancement models is a model matched with the video content type and the requirement on style, then each of the at least two color enhancement models may be used to process the video frame, to obtain an output result of each selected color enhancement model, and the output results of the selected color enhancement models may be performed a weighted fusion processing according to preset weights of the color enhancement models corresponding to the video frame, to generate the video output frame.

In the embodiment of the present disclosure, when the color adjustment is performed on the video frame using at least one color enhancement model in the color enhancement model pool, for the acquired video frame of the video to be processed, the matched color enhancement model may be firstly selected from the color enhancement model pool according to the received information including the video content type and the requirement on style of the video frame, and then the video frame of the video to be processed is processed using the selected color enhancement model, so as to generate a color toning effect corresponding to the received video content type and the requirement on style, thereby realizing automatic adjustment of the video to be processed, meeting the requirement on color style of the corresponding video content type, and improving the data processing efficiency of the video color adjustment.

Figure 3:
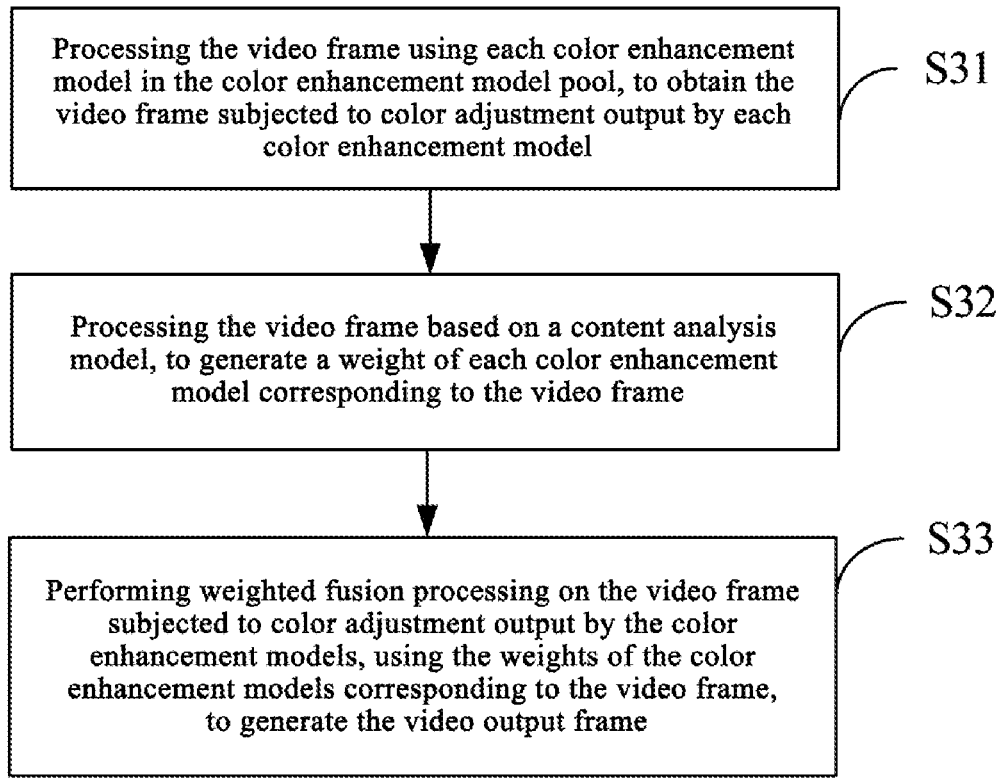
FIG. 3 is a flowchart of a color adjustment process in some embodiments of the present disclosure.

FIG. 3 illustrates a flowchart of a color adjustment process in some embodiments of the present disclosure. As shown in FIG. 3, in some embodiments, the step S120 may specifically include the following steps S31 to S33.

S31, processing the video frame using each color enhancement model in the color enhancement model pool, to obtain the video frame subjected to color adjustment output by each color enhancement model.

In this step, each color enhancement model in the color enhancement model pool processes the video frame of the video to be processed, and a result of color adjustment of each color enhancement model on the video frame according to the requirement on style of the corresponding video content type is obtained.

S32, processing the video frame based on a content analysis model, to generate a weight of each color enhancement model corresponding to the video frame: where the content analysis model is configured to determine the weight of each color enhancement model in the color enhancement model pool according to the video frame.

In this step, the content analysis model may assign a weight (may also be referred to as a weighing coeffient) to each color enhancement model in the color enhancement model pool through analyzing the video content type of the video frame, so that the output result of each model in the model pool is assigned a weight, according to the weight of each color enhancement model corresponding to the video frame output by the content analysis model.

S33, performing weighted fusion processing on the video frames subjected to color adjustment output by the color enhancement models, using the weights of the color enhancement models corresponding to the video frame, to generate the video output frame.

In this step, the weighted fusion process includes: performing matrix multiplication operation on the weight of each color enhancement model corresponding to the video frame and the video frame subjected to color adjustment output by the corresponding color enhancement model; and performing matrix addition on the multiplication operation results, to obtain the video output frame in a matrix form.

In the video processing method according to the embodiment of the present disclosure, each color enhancement model in the color enhancement model pool may be assigned a weight, according to the weight of each color enhancement model corresponding to the video frame, output by the content analysis model. Finally, a color adjustment result obtained by fusing the processing results of all the color enhancement models in the model pool is output, and the color adjustment result is based on the analysis on the video content type of the video to be processed, so that a video color adjustment result better conforming to the video content type is obtained.

Figure 4A:
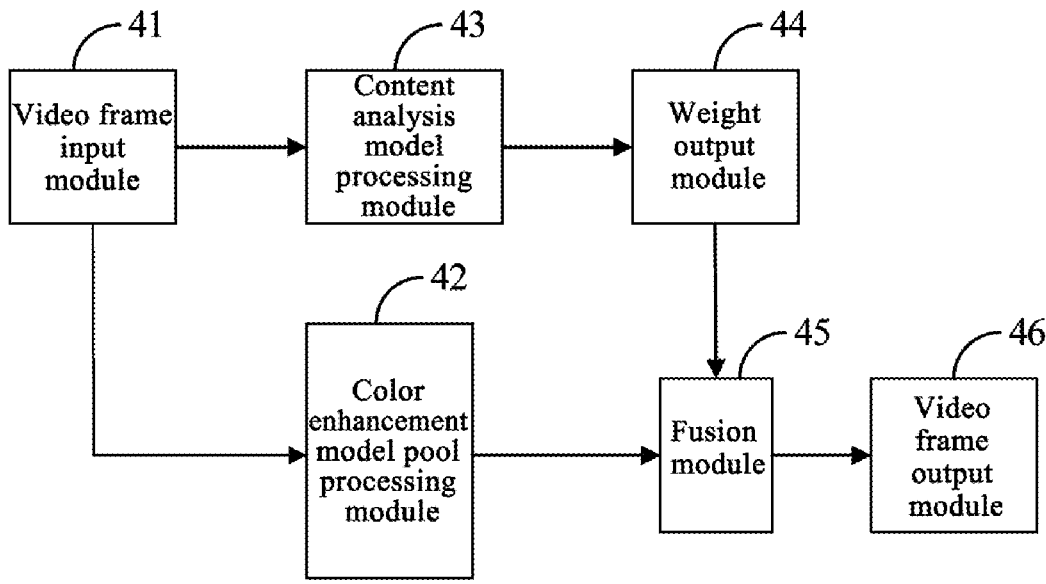
FIG. 4a is a schematic diagram illustrating a structure of a video processing system in some embodiments of the present disclosure.
Figure 4B:
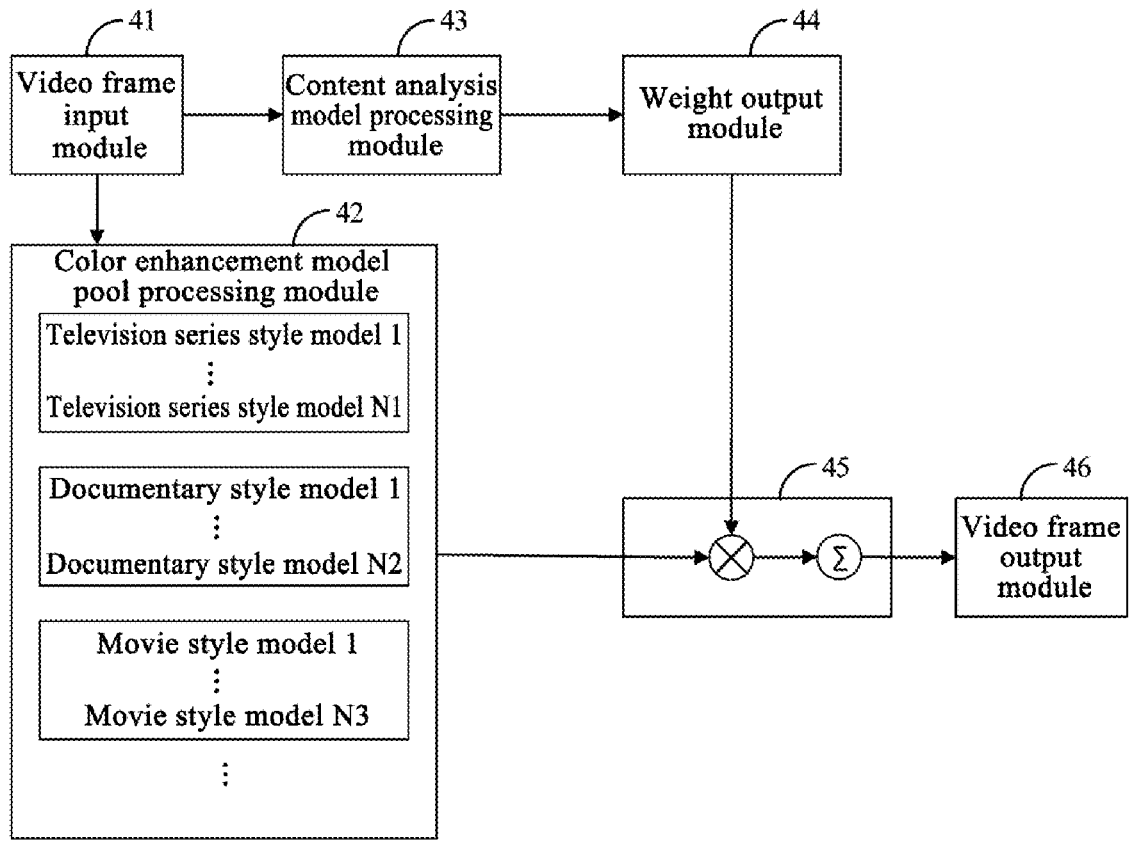
FIG. 4b is a schematic diagram illustrating a structure of a video processing system in some embodiments of the present disclosure.

The video processing system and the corresponding video processing method in the exemplary embodiments of the present disclosure are described below with reference to FIGS. 4a and 4b. FIG. 4a illustrates a schematic diagram of a structure of a video processing system in some embodiments of the present disclosure; and FIG. 4b illustrates a schematic diagram of a structure of a video processing system in some embodiments of the present disclosure. The same reference characters in FIGS. 4a and 4b may refer to the same structures.

As shown in FIG. 4a, in some embodiments, the video processing system includes: a video frame input module 41, a color enhancement model pool processing module 42, a content analysis model processing module 43, a weight output module 44, a fusion processing module 45, and a video frame output module 46.

In some embodiments, the video frame input module 41 may be used to acquire an input video frame.

In some embodiments, the execution device may acquire, from the received video processing instruction, the video frame carried in the instruction.

The color enhancement model pool processing module 42 is used to perform color adjustment on the video frame using at least one color enhancement model in the color enhancement model pool, to obtain a video output frame subjected to the color adjustment.

In some embodiments, the color enhancement model pool processing module may be referred to simply as the color enhancement model pool.

In some embodiments, in the case of acquiring an input video frame, if information including a video content type and a requirement on style of the video frame is further received, then a color enhancement model corresponding to the video content type and the requirement on style may be selected from a color enhancement model pool, and the video frame is processed using the selected color enhancement model, to obtain the video output frame subjected to the color adjustment.

In some embodiments, no matter whether the information including the video content type and requirement on style of the video frame is received, each color enhancement model in the color enhancement model pool may be used to process the video frame, to obtain a video frame subjected to the color adjustment output by each color enhancement model.

The content analysis model processing module 43 is used to process the video frames based on the content analysis model, to generate a weight of each color enhancement model corresponding to the video frame.

In some embodiments, the weight of each color enhancement model in the color enhancement model pool corresponding to the video frame may be preset. For example, when a large batch of videos to be processed of the same video content type with the same requirement on style thereof are processed, a weight may be pre-assigned to each color enhancement model in the color enhancement model pool, according to a plurality of test results or actual experiences.

In other embodiments, the video frame is processed based on the content analysis model, and the weight of each color enhancement model corresponding to the video frame can be automatically generated, so that the participation of manual processing is reduced, which is favorable to realize the automation of color creation on the video, the video reproduction cost is greatly reduced, and the video processing efficiency is improved.

The weight output module 44 is used to output a weight of each color enhancement model corresponding to the video frame.

The fusion processing module 45 is used to perform a weighted fusion processing on the video frames subjected to color adjustment output by the color enhancement models, using the weights of the color enhancement models corresponding to the video frame, to obtain a fusion result.

The video frame output module 46 is used to generate the video output frame subjected to color adjustment, according to the fusion result.

In the embodiment of the present disclosure, color adjustment may be performed on an acquired video frame according to at least one color enhancement model in the color enhancement model pool, and a color toning effect corresponding to the video content type and the requirement on style of the video frame is automatically generated. Further, each color enhancement model in the color enhancement model pool is assigned a weight, according to the weight of each color enhancement model corresponding to the video frame output by the content analysis model, and the color adjustment result obtained by fusing the processing results of all the color enhancement models is output, so that a video color adjustment result better meeting the requirement on style of the video content type is obtained, the automatic adjustment of the video color is realized, the video reproduction cost can be reduced, and the video processing efficiency can be improved.

As shown in FIG. 4b, the video processing system is substantially the same as the video processing system in FIG. 4a, except that a plurality of color enhancement models in the color enhancement model pool are shown in FIG. 4b.

In FIG. 4b, the color enhancement model pool includes at least one group of color enhancement models, and each group of color enhancement models corresponds to one video content type. Each group of color enhancement models includes at least one color enhancement model, and each color enhancement model corresponds to one requirement on style.

Illustratively, a first group of color enhancement models is a group of models corresponding to a video of television series, and the group of models include N1 number of models, such as television series style model 1, television series style model 2 . . . , television series style model N1. Each model in the group of models may correspond to a different requirement on style of the video of television series. A second group of color enhancement models is a group of models corresponding to a documentary video, and the group of models include N2 number of models, such as documentary style model 1, documentary style model 2 . . . documentary style model N2. Each model in the group of models corresponds to a different requirement on style of the documentary video. A third group of color enhancement models is a group of models corresponding to a movie video, and the group of models include N3 number of models, such as movie style model 1, movie style model 2 . . . , movie style model N3. Each model in the group of models may correspond to a different requirement on style of the movie video. N1, N2, and N3 are each an integer greater than or equal to 1.

It should be understood that other groups of models corresponding to at least one requirement on style of other video content types may also be included in the color enhancement model pool, and may be specifically set according to an actual situation, which is not specifically limited by the embodiment of the present disclosure.

With continued reference to FIG. 4b, the particular processing units in the fusion module are shown in FIG. 4b, where the symbol ⊗ represents a matrix multiplication operation and the symbol Σ represents a matrix addition operation. In some embodiments, the fusion module may be specifically used for: performing matrix multiplication operation on the weight of each color enhancement model corresponding to the video frame output by the content analysis model and the video frame subjected to color adjustment output by the corresponding color enhancement model; and performing matrix addition on the matrix multiplication operation results, to obtain a matrix addition result, to be used for generating the video output frame according to the matrix addition result.

In the embodiment of the present disclosure, the video processing method may be automatically implemented by the execution device using an Artificial Intelligence (AI) model. The AI model may be a model implemented based on a convolutional neural network, and may be used in the image processing fields of image detection, image classification, image content analysis, and the like. Both of the color enhancement model and the content analysis model in the embodiments of the present disclosure are AI models.

In some embodiments, the models in the color enhancement model pool have a same model structure. The specific structure and operation principle of the color enhancement model are described in detail below with reference to FIGS. 5 to 8.

Figure 5:
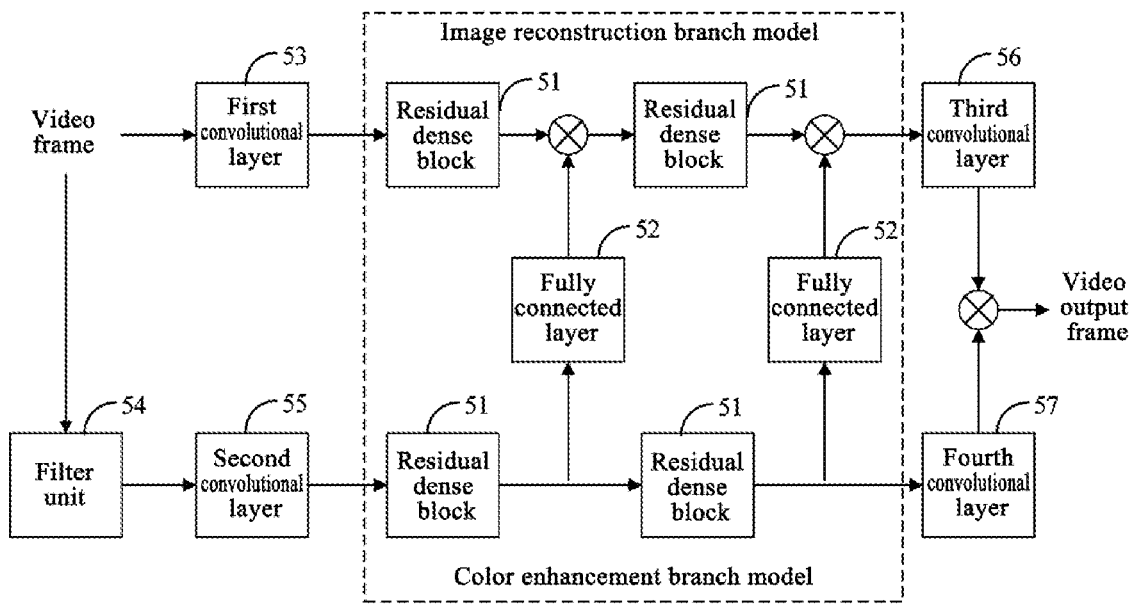
FIG. 5 is a schematic diagram illustrating a specific architecture of a color enhancement model in an embodiment of the present disclosure.

FIG. 5 illustrates a schematic diagram of a specific architecture of a color enhancement model in an embodiment of the present disclosure.

In FIG. 5, the color enhancement model includes 2N number of Residual Dense Blocks (RDBs) 51 and N number of fully connected layers 52, where N is an integer greater than or equal to 1. Illustratively, the color enhancement model includes at least two RDBs 51 and at least one fully connected layer 52.

In the network structure of the color enhancement model shown in FIG. 5, the above 2N number of RDBs may be set as two task branch models: an Image Reconstruction (IR) branch model and a color enhancement branch model, where each task branch model includes N number of RDBs 51.

With continued reference to FIG. 5, the color enhancement model may further include a first convolutional layer 53, a filter unit 54, a second convolutional layer 55, a third convolutional layer 56, and a fourth convolutional layer 57.

Figure 6:
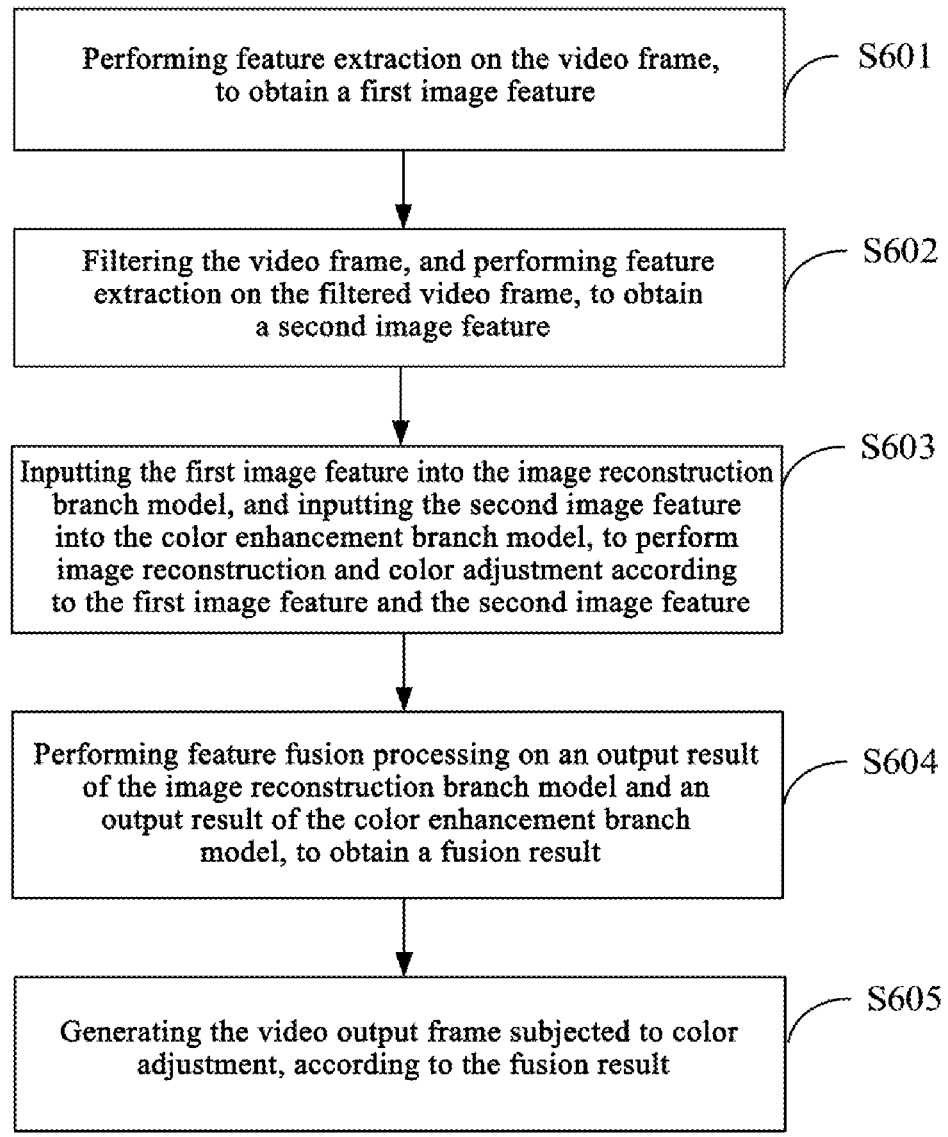
FIG. 6 is a specific flowchart of color adjustment on a video frame using a color enhancement model in an embodiment of the present disclosure.
Figure 7:
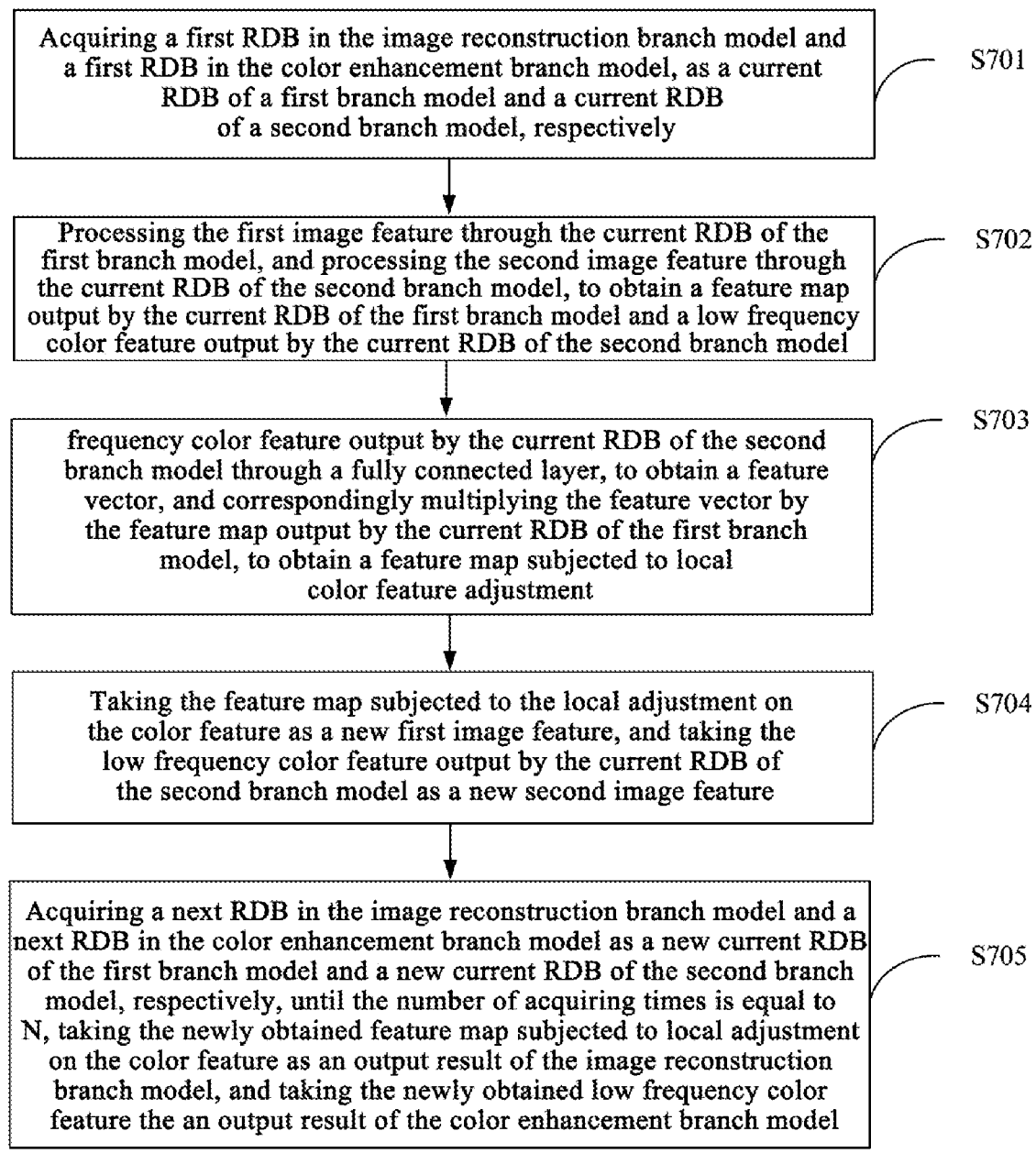
FIG. 7 is a specific flowchart of image reconstruction and color adjustment in an embodiment of the present disclosure.

How the color adjustment of the video frame is performed by the color enhancement model in FIG. 5 is described below with reference to FIGS. 6 and 7. FIG. 6 illustrates a specific flowchart of color adjustment on a video frame using a color enhancement model in an embodiment of the present disclosure; and FIG. 7 illustrates a specific flowchart of image reconstruction and color adjustment in the embodiment of the present disclosure.

As shown in FIG. 6, the processing the video frame using the selected color enhancement model, to obtain the video output frame subjected to color adjustment, in step S23, may specifically include the following steps S601 to S605.

S601, performing feature extraction on the video frame, to obtain a first image feature.

In this step, the feature extraction may be performed on the video frame input to the color enhancement model, through the first convolutional layer 53 in the color enhancement model, to obtain the first image feature.

S602, filtering the video frame, and performing feature extraction on the filtered video frame, to obtain a second image feature.

In this step, the filter unit 54 may perform filtering processing on the video frame input to the color enhancement model, and the second convolutional layer 55 may perform the feature extraction on the filtered video frame, to obtain the second image feature.

In some embodiments, the filter unit 54 may be one of a Gaussian filter unit, a mean filter unit, and a median filter unit. The Gaussian filter unit is used to perform Gaussian filtering on the video frame: the mean filter unit is used to perform a mean filtering on the video frames; and the median filter unit is used to perform a median filtering on the video frame.

Specifically, the Gaussian filtering is a linear smoothing filtering, and is suitable for eliminating Gaussian noise. In some scenes, the Gaussian smoothing filter is very effective in suppressing noise that follows normal distribution. The mean filtering may take the pixel mean of local image information of image pixel points in a video frame as the pixel value subjected to the processing of the image pixel points, and has a simple filtering algorithm and a high calculation speed. The median filtering may sequentially arrange the gray values of the image pixel points in the video frame from high to low, and take the median value of gray values as the gray value of the image pixel points. In some scenes, median filtering may be beneficial to better preserve the image boundaries when reducing noise in an image.

In the embodiment of the present disclosure, the filter unit is used to perform the filtering processing on the video frame, which is not only beneficial to removing noise in the video frame and realizing smooth transition of an image in the video frame, but also beneficial to enhancing low frequency characteristics of the image in the video frame, to obtain low frequency information of the image in the video frame.

In some embodiments, if a difference between the pixel values of adjacent pixels in a region in an image is small (less than or equal to a pixel value threshold), the information of the region is low frequency information: if the difference between pixel values of the adjacent pixels in a region in an image is large (exceeds the pixel value threshold), the information of the region is high frequency information.

In some embodiments, the low frequency information may be color information, grayscale information, etc. of the image, and the high frequency information may refer to texture information, edge information, etc. of the image. Subjected to the filtering processing of the filter unit, the image feature extracted subsequently is facilitated to be less affected by the influence of high frequency information such as image noise, image texture and the like, so that more low frequency color feature (also referred to as color feature with low frequency) is reserved.

It should be understood that the filter unit may alternatively be other types of filter units for performing other types of filtering processing on the video frame. Specifically, the type of the filter unit may be selected according to actual needs, which is not specifically limited by the embodiment of the present disclosure.

S603, inputting the first image feature into the image reconstruction branch model, and inputting the second image feature into the color enhancement branch model, to perform image reconstruction and color adjustment according to the first image feature and the second image feature.

Image Reconstruction (IR) is a technique of processing an existing Low-resolution (LR) image and converting the LR image into a High-resolution (HR) image.

In this step, the image reconstruction branch model performs feature extraction on the first image feature of the video frame through RDB, and performs rough reconstruction on the output image. In the rough reconstruction, the video frame of the video to be processed is taken as an initial image, the initial image is subjected to feature extraction by a convolutional layer to obtain feature information of the initial image, the feature information of the initial image is extracted using the RDB, and an image obtained through reconstruction according to the feature information of the initial image may be called a roughly reconstructed image.

In this step, the second image feature (i.e., a low frequency color feature) obtained through the filtering processing of the filter unit is analyzed and extracted, to be used for subsequently performing color adjustment according to the analyzed and extracted feature.

S604, performing feature fusion processing on an output result of the image reconstruction branch model and an output result of the color enhancement branch model, to obtain a fusion result.

In this step, the output result of the image reconstruction branch model and the output result of the color enhancement branch model are multiplied in a corresponding feature channel, and results of the multiplication operation of the feature channels are subjected to the feature addition throughout the feature channels, to obtain a fusion result.

S605, generating the video output frame subjected to color adjustment, according to the fusion result.

In this step, an output result of a global color adjustment on the input video frame is obtained, according to the fusion result.

Illustratively, a feature extraction is performed on the output result of the image reconstruction branch model using the third convolutional layer 56, and a feature extraction is performed on the output result of the color enhancement branch model using the fourth convolutional layer 57. The result of the feature extraction of the third convolutional layer 56 and the result of the feature extraction of the fourth convolutional layer 57 are multiplied in a corresponding feature channel, and the feature of the two task branch models are fused, to obtain the output result of color adjustment of the color enhancement model.

In the embodiment of the present disclosure, when the color enhancement model is used to process a video frame, the image reconstruction and the color adjustment may be performed on the input video frame through the image reconstruction branch model and the color enhancement branch model, and the feature fusion processing may be performed on the output result of the image reconstruction branch model and the output result of the color enhancement branch model, to obtain the output result of color adjustment of the color enhancement model.

In FIG. 5, a size (i.e., a width and a height) of a convolutional kernel in each RDB 51 is the same. For example, the size of the convolutional kernel in RDB 51 is 3×3, and the number of output feature channels is 64. A size of the filter kernel in the filter unit 54 is 21×21. A size of the first convolutional layer 53 is the same as a size of the second convolutional layer 55, for example, both of the two sizes are 3×64. A size of the third convolutional layer 56 is the same as a size of the fourth convolutional layer 57, for example, both of the two sizes are 64×3.

It should be noted that, in the embodiment of the present disclosure, the number and size of convolutional kernels for feature extraction, the number and size of convolutional kernels in each RDB 51, and the number and size of filter kernels in the filter unit 54 may be set as needed, which are not particularly limited by the embodiment of the present disclosure.

In some embodiments, for two task branch models (i.e., the image reconstruction branch model and the color enhancement branch model) in the color enhancement model shown in FIG. 5, each branch model may include N number of residual dense blocks RDBs; and the color enhancement model further includes N number of fully connected layers: where N is an integer greater than or equal to 1. The following describes the processes of image reconstruction and color adjustment based on the model architecture of the two task branch models with reference to a specific embodiment.

As shown in FIG. 7, the inputting the first image feature into the image reconstruction branch model and inputting the second image feature into the color enhancement branch model, to perform image reconstruction and color adjustment according to the first image feature and the second image feature, in step S603, may specifically include the following steps S701 to S705.

S701, acquiring a first RDB in the image reconstruction branch model and a first RDB in the color enhancement branch model, as a current RDB of a first branch model and a current RDB of a second branch model, respectively.

S702, processing the first image feature through the current RDB of the first branch model, and processing the second image feature through the current RDB of the second branch model, to obtain a feature map output by the current RDB of the first branch model and a low frequency color feature output by the current RDB of the second branch model.

S703, processing the low frequency color feature output by the current RDB of the second branch model through a fully connected layer, to obtain a feature vector, and correspondingly multiplying the feature vector by the feature map output by the current RDB of the first branch model, to obtain a feature map subjected to local color feature adjustment.

In this step, image feature extraction may be performed through the current RDB (e.g., the convolutional kernel has a size of 3×3, and the number of the output feature channels is 64) in the image reconstruction branch model. The low frequency color feature of the image is analyzed and extracted through the current RDB (e.g., the convolutional kernel has a size of 3×3, and the number of the output feature channels is 64) in the color enhancement branch model, each layer of features in the extracted low frequency color features is converted into a feature vector with a width of 1 (such as a feature vector with the size of 1×64) through a fully connected layer, and each element in the feature vector output by the fully connected layer is multiplied by the feature map output by the image reconstruction branch model in a corresponding feature channel of the feature map output by the current RDB, so that a local fine adjustment on the color feature can be realized.

S704, taking the feature map subjected to the local adjustment on the color feature as a new first image feature, and taking the low frequency color feature output by the current RDB of the second branch model as a new second image feature.

S705, acquiring a next RDB in the image reconstruction branch model and a next RDB in the color enhancement branch model as a new current RDB of the first branch model and a new current RDB of the second branch model, respectively, until the number of acquiring times is equal to N, taking the newly obtained feature map subjected to local adjustment on the color feature as an output result of the image reconstruction branch model, and taking the newly obtained low frequency color feature the an output result of the color enhancement branch model.

Through the steps S701 to S705, the low frequency color feature extracted by the last RDB in the color enhancement branch model is obtained, the low frequency color feature is converted into a feature vector with a width of 1 through the last fully connected layer, and each element in the feature vector output by the last fully connected layer is multiplied by the feature map output by the last RDB in the image reconstruction branch model in a corresponding feature channel, to obtain an output result of the image reconstruction branch model in the color enhancement model. The low frequency color feature extracted by the last RDB in the color enhancement branch model is taking as the output result of the color enhancement branch model in the color enhancement model. The feature fusion processing is performed, based on the output result of the image reconstruction branch model and the output result of the color enhancement branch model, to obtain an output result of color adjustment of the color enhancement model, thereby realizing a global color style enhancement.

Figure 8:
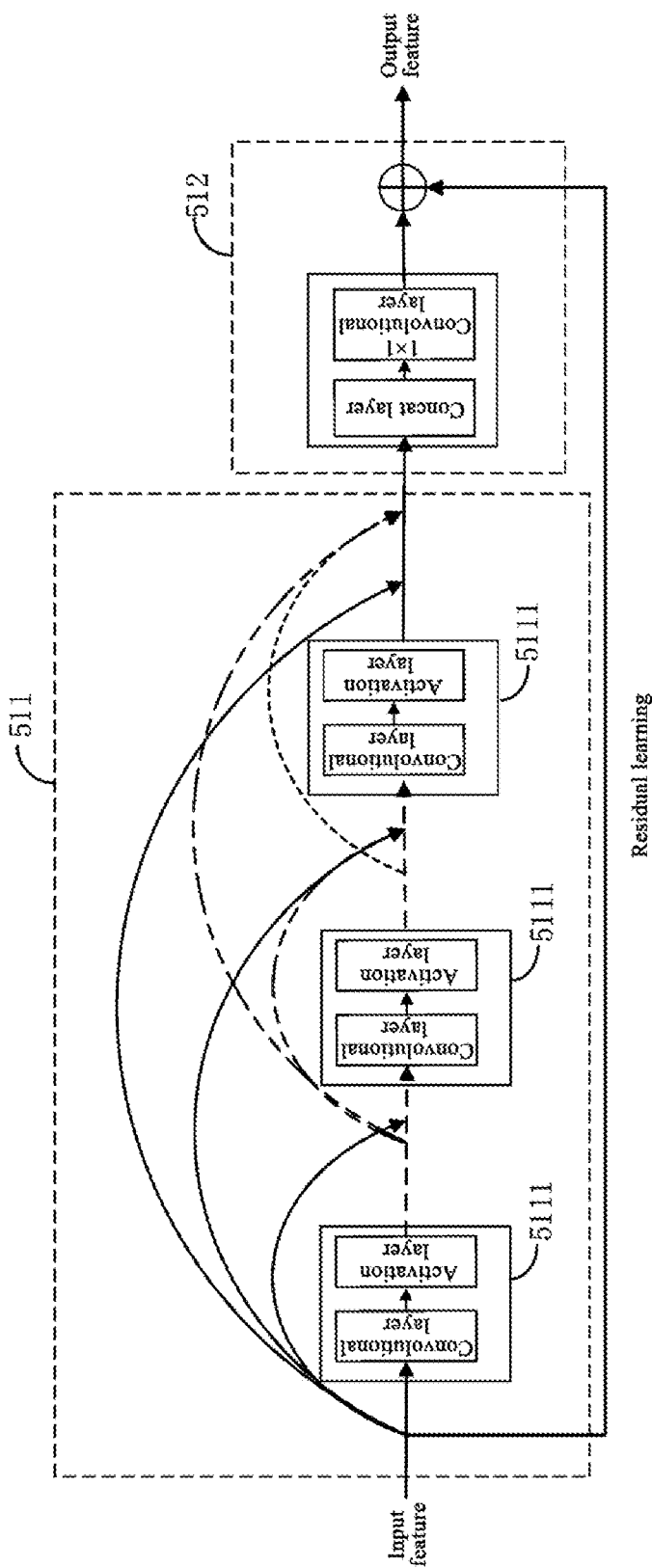
FIG. 8 is a diagram illustrating a specific architecture of a residual dense block in an embodiment of the present disclosure.

FIG. 8 illustrates a diagram of a specific architecture of a residual dense block in an embodiment of the present disclosure. As shown in FIG. 8, in some embodiments, each RDB includes a densely connected convolutional network (DenseNet) 511 and a local feature fusion layer 512.

In this embodiment, the local feature fusion layer 512 is used for performing feature fusion processing on the input feature to the RDB and the output feature of the DenseNet 511 using local residual learning, to obtain the output feature of the RDB.

In some embodiments, the DenseNet 511 includes M number of dense blocks 5111, where M is an integer greater than or equal to 1. An input to a first dense block 5111 is the input feature to the RDB; and an input feature to the $i^{th}$ dense block 5111 is the input feature to the RDB and the output features of all dense blocks 5111 before the $i^{th}$ dense block 5111, where i is an integer greater than 1 and less than or equal to M.

In FIG. 8, three dense blocks 5111 included in the DenseNet 511 in the case of M=3 is shown. In actual application scenes, the number of the dense blocks 5111 may be set according to actual needs.

With continued reference to FIG. 8, an input to the local feature fusion layer 512 includes the input feature to the RDB (e.g., which may be denoted as $F_{d-1}$) and output feature of the dense blocks 5111 (e.g., which may be denoted as $F_{d,1}$, $F_{d,C}$, etc.). The local feature fusion layer 512 may include a concat layer and a convolutional layer with a size of 1×1. The concat layer fuses feature input to the concat layer in a concatenation manner, and the 1×1 convolutional layer is used for adaptively fusing a series of feature of different layers, to generate the output feature (e.g., which may be denoted as $F_{d,LF}$) of local feature fusion. The output feature of the local feature fusion and the input feature to the RDB are subjected to the feature addition in the corresponding channel, to generate a global feature fusion result (e.g., which may be denoted as $F_d$), and the global feature fusion result is taken as the output feature of the RDB.

In the embodiment of the present disclosure, the RDB is of a network structure combining a residual network and a dense network, and realizes information sharing by retaining low-level information and adaptively acquires information acquired by different convolutional layers through feature fusion, under the combined action of dense connection, feature fusion and residual learning, so that better performance is realized in the image processing direction. Specifically, the middle layer of the RDB may use the dense connection mode of the dense block 5121, and the connection block 5122 of the last layer outputs the processed result of the RDB in a manner of residual skip connection.

In this embodiment, each dense block in the RDB may transmit feature information to be stored to a subsequent dense block. The network structure may fully ensure transmission and circulation of the feature information between every two adjacent layers, reduce parameter amount while implementing feature reuse, and ensure a better processing speed in a case where an amount of the network parameters is large.

In some embodiments, each color enhancement model in the color enhancement model pool has the same model structure. The color enhancement model in the color enhancement model pool is a trained color enhancement model obtained through pre-training an initial color enhancement model by adopting different color enhancement data pairs for different color styles of different video content types. The color enhancement data pair includes an un-toned image block and a toned image block with a same image size, which are selected from an un-toned image and a first toned image, respectively, at a same position in image, where the first toned image is an image pre-acquired by toning the un-toned image based on the color style characteristics of the image.

In this embodiment, the initial color enhancement model has the same model structure as each color enhancement model in the color enhancement model pool. Initial values of the model parameters of the initial color enhancement model may be random values of parameters of the model or empirical values of parameters of the model. The first toned image may be a pre-acquired image subjected to color adjustment performed by a colorist. The training data of the color enhancement network model includes image blocks with the same image size selected from the un-toned image and the first toned image at the same positions in image. Illustratively, an image block with a size of 256×256 at a certain position in an image may be randomly extracted and input to the network for training, during the training process of each color enhancement model.

It should be understood that the size of the image block required in the training process may be selected according to actual needs, which is not particularly limited in the embodiments of the present disclosure.

In some embodiments, training an initial color enhancement model, i.e., a color enhancement model, may include: processing an un-toned image block selected from the un-toned image using an initial color enhancement model, to obtain a color adjustment result of the un-toned image block, and acquiring a toned image block corresponding to the un-toned image block from the color enhancement data pair, as a color adjustment reference result: constructing a loss function of the initial color enhancement model based on the color adjustment result and the color adjustment reference result: adjusting model parameters of the initial color enhancement model using the loss function of the initial color enhancement model, to obtain an updated color enhancement model; and taking the updated color enhancement model as a new initial color enhancement model, and processing the un-toned image block selected from the un-toned image using the new initial color enhancement model, until the training process of the initial color enhancement model meets a first training end condition, to obtain the trained color enhancement model.

The first training end condition includes at least one of the following conditions that a training loss calculated according to the loss function of the initial color enhancement model is less than or equal to a set first loss threshold, or the number of training times for the initial color enhancement model reaches a set first threshold of number of times.

In the embodiment of the present disclosure, the loss function may be used to estimate a gap between the result of each model training and the training target. For the initial color enhancement model, the result of each model training is the color adjustment result of the un-toned image block output by the initial color enhancement model, and the training target is the corresponding color adjustment reference result. The first loss threshold and the first threshold of number of times may be customized according to the actual training requirements.

In some embodiments, in the training process of the color enhancement model, the step of constructing the loss function of the initial color enhancement model based on the color adjustment result and the color adjustment reference result may specifically include: calculating a minimum square error between the color adjustment result and the color adjustment reference result, to obtain a minimum square error loss; calculating a Gaussian filter output result of the color adjustment result and a Gaussian filter output result of the color adjustment reference result, to obtain a color loss; and performing weighted summation on the minimized square error loss and the color loss, to generate the loss function of the initial color enhancement model.

Illustratively, the loss function of the initial color enhancement model may be expressed as the following expression (1):

$$\text{Loss1} = a * \left\| \hat{I}_1 - I_{grl1} \right\|_2 + b * \left\| \text{Gauss}(\hat{I}_1) - \text{Gauss}(I_{grl}) \right\|_2. \quad (1)$$

In the above expression (1), Loss1 is the Loss function of the initial color enhancement model, $\hat{I}_1$ is the color adjustment result, $I_{grl}$ is the color adjustment reference result, Gauss is a function of calculating a Gaussian filter output result, where a size of the filter kernel is a size of a filter kernel of a filter unit in the trained color enhancement model, $\|\hat{I}_1 - I_{grl}\|_2$, is an L2 norm of a difference between the color adjustment result and the color adjustment reference result, i.e., an L2 Loss of image feature of each model training of the initial color enhancement model, $\|\text{Gauss}(\hat{I}) - \text{Gauss}(I_{grl})\|_2$, is an L2 norm of a difference between the Gaussian filter output result of the color adjustment result of each model training of the initial color enhancement model and the Gaussian filter output result of the color adjustment reference result, i.e., a color Loss of each model training: a is a weight of the L2 loss, b is a weight of the color loss; and both of a and b may be preset according to actual training needs or empirical values.

In some embodiments, a network optimizer, such as Adam optimizer, may be used in the training process of the model, to ensure that the output result (color adjustment result) of each model training is closer to the target (color adjustment reference result) of the model training.

In the embodiment of the present disclosure, the color enhancement model may be trained, by adopting different color enhancement data pairs for different requirements on styles of different video content types, to obtain a set of models, which perform color adjustment on the video frame according to different requirements on styles of different video content types to generate different color toning effects, so that a color enhancement model pool is obtained, to be used for performing automatic color adjustment on video frames of a video to be processed according to the color enhancement model pool, thereby improving the efficiency of color adjustment.

Figure 9:
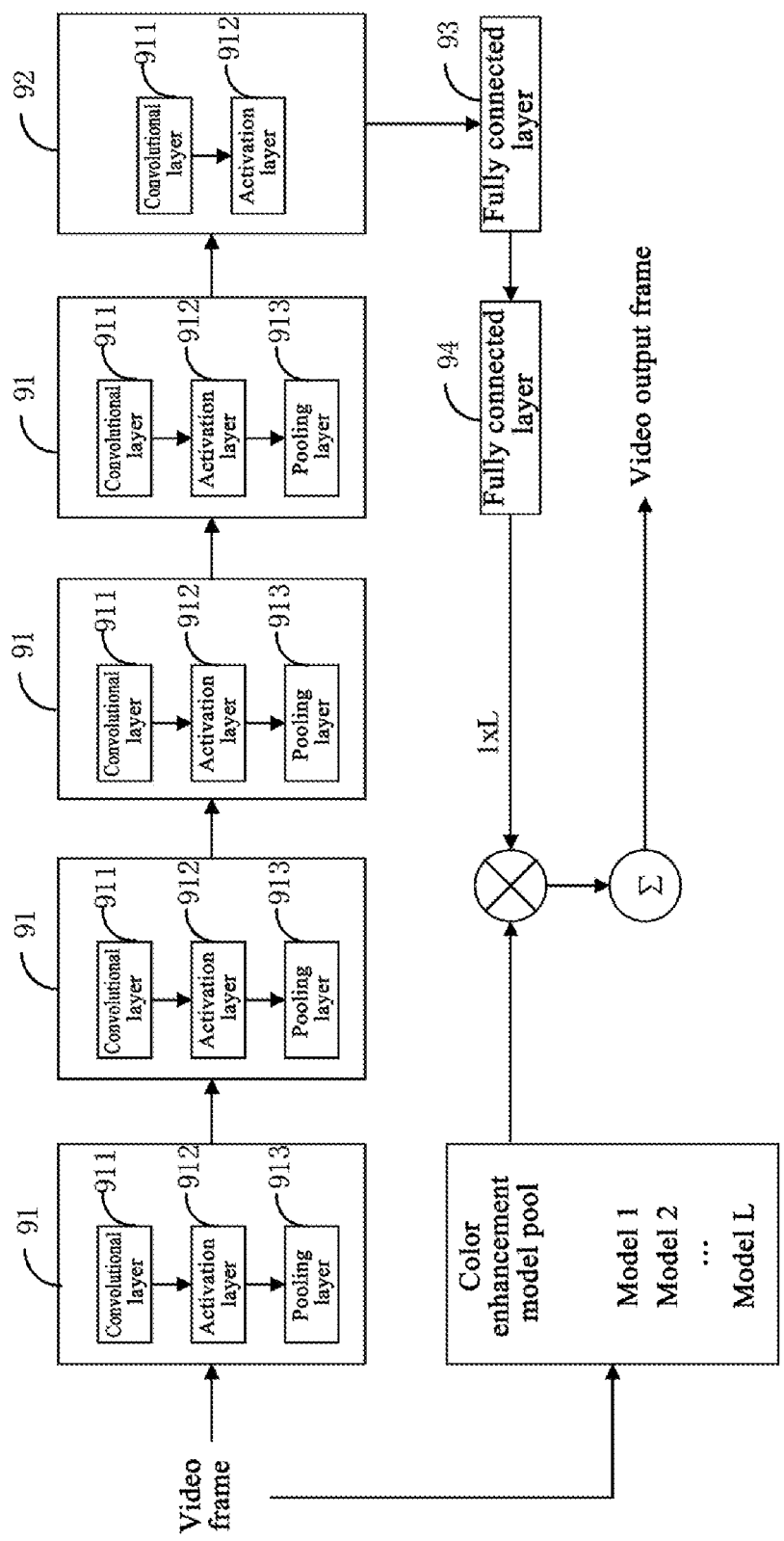
FIG. 9 is a diagram illustrating a specific architecture of a content analysis model in an embodiment of the present disclosure.

FIG. 9 illustrates a diagram of a specific architecture of a content analysis model in an embodiment of the present disclosure. As shown in FIG. 9, in some embodiments, the content analysis model includes a convolutional network of K number of stacked convolutional structures 91 connected in sequence and two fully connected layers.

Each of the preceding K−1 number of stacked convolutional structures 91 includes a convolutional layer 911, an activation layer (Rectified Linear Unit, ReLU) 912 and a pooling layer (Max Pooling) 913. The K$^{th}$ stacked convolutional structure 92 includes a convolutional layer 911 and an activation layer 912. The two fully connected layers are a fully connected layer 93 and a fully connected layer 94.

In the embodiment of the present disclosure, the activation layer 912 may be used to perform nonlinear mapping on an output result of the corresponding convolutional layer, to accelerate the convergence speed of the model. The pooling layer 913 may be used to perform under sampling on the image, and dimensions of the image feature may be reduced through the under sampling, so that accuracy may be improved, and over-fitting may be avoided.

In FIG. 9, as an example, a size of the input image is 256×256×3 (length, width, and height), and a size of the convolutional layer in each of the stacked convolutional structures 91 in the content analysis model may be 3×3. Taking K=5 as an example, for the five stacked convolutional structures 91 connected in sequence, a size of the input image may be scaled to 128×128×32 in the 1$^{st}$ stacked convolutional structure 91, to 64×64×64 in the 2$^{nd}$ stacked convolutional structure 91, to 32×32×128 in the 3$^{rd}$ stacked convolutional structure 91, to 16×16×256 in the 4$^{th}$ stacked convolutional structure 91, and to 8×8×512 in the 5$^{th}$ stacked convolutional structure 91.

With continued reference to FIG. 9, the fully-connected layer 93 converts the output of the last stacked convolutional structure 91 into a one-dimensional vector with a specified dimension (e.g., 1×1024), and the fully-connected layer 94 is used to convert the one-dimensional vector into a one-dimensional vector with a dimension of L, where L is a total number of models in the color enhancement model pool.

In some embodiments, the color enhancement model pool in FIG. 9 has the same model structure as the color enhancement model pool described in the above embodiments with reference to FIGS. 4a and 4b.

In the embodiment of the present disclosure, the stacked convolutional network structure in the content analysis model may analyze and extract image feature in a manner of stacking convolutional layers. Feature extraction is performed by the convolutional layers, and an output of the final convolutional layer is converted into L number of weights through the two fully connected layers, where L is an integer greater than or equal to 1. Each weight is multiplied by the output result of a corresponding color enhancement model, and the multiplication results are subjected to the feature addition in the corresponding feature channel, to generate a final color enhancement result, so that different weights are assigned to different color enhancement models by analyzing the content of the video frame, thereby achieving the purpose of performing an adaptive color adjustment according to the content.

In some embodiments, the content analysis model is a trained content analysis model obtained by training an initial content analysis model based on each color enhancement model in a pre-trained color enhancement model pool and using image data pairs of different styles. The image data pair includes an un-toned image block and a toned image block with a same image size, which are selected from an un-toned image and a second toned image, respectively, at a same position in image, where the second toned image is an image pre-acquired by toning the un-toned image based on different video content types.

In this embodiment, the model structure of the initial content analysis model is the same as the model structure of the content analysis model. Initial values of the model parameters of the initial content analysis model may be random values of parameters of the model or empirical values of parameters of the model. The second toned image may be a pre-acquired image subjected to color adjustment performed by a colorist. The second toned image is different from the first toned image in the above-described embodiments.

The training data of the content analysis model includes image blocks of the same image size selected from the un-toned image and the second toned image at the same position in image. Illustratively, an image block with a size of 256×256 at a certain position in an image may be randomly extracted and input to the network for training, during the training process of content analysis model. The manner of random extraction may ensure that the model does not over-fit a certain style.

It should be understood that the size of the image block required in the training process may be selected according to actual needs, which is not particularly limited in the embodiments of the present disclosure.

In some embodiments, training an initial content analysis model includes: processing the un-toned image block selected from the un-toned images using each color enhancement model in a pre-trained color enhancement model pool, to obtain the color adjustment result of each color enhancement model on the un-toned image block; processing the un-toned image blocks using the initial content analysis model, to obtain a predetermined number of weights, where the predetermined number is the same as the number of color enhancement models in the color enhancement model pool: performing weighted fusion processing on the color adjustment results of all the color enhancement models on the un-toned image block, according to the predetermined number of weights, to obtain a color enhancement result of the un-toned image block, and acquiring a toned image block corresponding to the un-toned image block from the image data pair, as the color enhancement reference result: constructing a loss function of the initial content analysis model based on the color enhancement result and the color enhancement reference result of the un-toned image block: adjusting model parameters of the initial content analysis model using the loss function of the initial content analysis model, to obtain an updated content analysis model; and taking the updated content analysis model as a new initial content analysis model, and processing the un-toned image block using the new initial content analysis model, until the training process of the initial content analysis model meets a second training end condition, to obtain the trained content analysis model.

The second training end condition includes at least one of the following conditions that a training loss calculated according to the loss function of the initial content analysis model is less than or equal to a set second loss threshold, or the number of training times of the initial content analysis model reaches a set second threshold of number of times.

In this embodiment, for the initial content analysis model, the result of each model training is the color enhancement result of the un-toned image block output by the content analysis model, and the training target is the corresponding color enhancement reference result. The loss function of the initial content analysis model is constructed according to the result of each model training of the initial content analysis model and the training target. It should be understood that the second loss threshold and the second threshold of number of times may be customized according to actual training requirements.

In some embodiments, in the training process of the content analysis model, the loss function of the initial content analysis model is a loss function constructed from the minimized square error of the color enhancement result of the un-toned image block and the color enhancement reference result.

Illustratively, the loss function of the initial content analysis model may be expressed as the following expression (2):

$$\text{Loss2} = \left\| \hat{I}_2 - I_{gt2} \right\|_2. \quad (2)$$

In the above expression (2), Loss2 is the Loss function of the initial content analysis model, $\hat{I}_2$ is the color enhancement result, $I_{gt1}$ is the color enhancement reference result, and $\|\hat{I}_2 - I_{gt2}\|_2$, is an L2 norm of a difference between the color enhancement result and the color enhancement reference result, i.e., an L2 loss of image feature of each model training of the initial content analysis model.

In some embodiments, a network optimizer, such as Adam optimizer, also may be used in the training process of the model, to ensure that the output result (color enhancement result) of each model training is closer to the target (color enhancement reference result) of the model training.

In the training process of the color enhancement model and the content analysis model, a learning rate of model training may be set. The learning rate determines whether and when the loss function can converge to a local minimum. As an example, the learning rates may be the same, e.g., both 1e-4, for the training process of the color enhancement model and the training process of the content analysis model. In other examples, the learning rates in the model training processes of the two models may alternatively be different, and the specific values of the learning rates may be set according to actual situations.

In the embodiment of the present disclosure, the initial content analysis model may be trained, by adopting different color enhancement data pairs for different requirements on styles of different video content types. The trained content analysis model may output a weight of each color enhancement model in the color enhancement model pool corresponding to the video frame. A weighting fusion processing is performed according to the weight of each color enhancement model in the color enhancement model pool corresponding to the video frame and an output result of the corresponding color enhancement model, so that an adaptive color style enhancement processing on the video frame is realized, and the efficiency of video color enhancement is improved.

It is understood that the above-described embodiments of the method of the present disclosure may be combined with each other to form a combined embodiment without departing from the principle logic, which is not repeated herein, limited by the length of the present disclosure. One of ordinary skill in the art will appreciate that in the above methods of the specific embodiments, the specific execution order of the steps should be determined by their function and their possible inherent logic.

In addition, the present disclosure further provides a video processing apparatus, an electronic device, and a computer readable storage medium, which can be used to implement any video processing method provided by the present disclosure, and the corresponding technical solutions and descriptions thereof refers to the corresponding descriptions in the methods section, and are not repeated herein.

An embodiments of the present disclosure provide a video processing apparatus, which is a corresponding apparatus for implementing the video processing method provided by the above embodiments of the present disclosure. The apparatus may be implemented in a software and/or hardware manner, and generally may be integrated in an electronic device.

Figure 10:
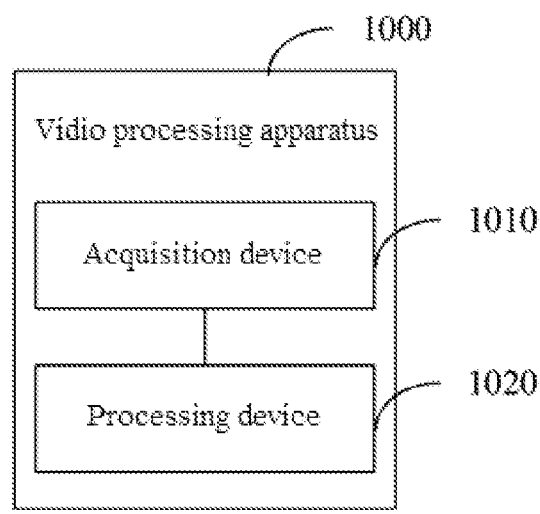
FIG. 10 is a schematic diagram illustrating a structure of a video processing apparatus in an embodiment of the present disclosure.

FIG. 10 is a schematic diagram illustrating a structure of a video processing apparatus in an embodiment of the present disclosure.

Referring to FIG. 10, the video processing apparatus 1000 provided in an embodiment of the present disclosure includes the following devices.

An acquisition device 1010 is used to acquire a video frame to be processed.

A processing device 1020 is used to perform color adjustment on the video frame using at least one color enhancement model in a color enhancement model pool, to obtain a video output frame subjected to color adjustment.

The color enhancement model pool includes a set of models for performing color adjustment on videos of various video content types with different requirements on styles thereof.

According to the video processing device provided by the embodiment of the present disclosure, the color adjustment is performed on the acquired video frame of the video to be processed according to at least one color enhancement model in the model pool, a color toning effect corresponding to the video content type and the requirement on style of the video frame can be automatically generated, and the video processing process can be automatically realized through calling the model by the execution device, so that video color creation can be automatically performed, the labor cost can be saved, and the video processing efficiency can be improved.

In some embodiments, the processing device 1020 may specifically include: a receiving unit for receiving information including the video content type and the requirement on style of the video frame: a selection unit for selecting the color enhancement model corresponding to the video content type and the requirements on style from the color enhancement model pool; and a model processing unit for processing the video frame using the selected color enhancement model, to obtain the video output frame subjected to color adjustment.

In some embodiments, the processing device 1020 may specifically include: a color adjusting unit for processing the video frame using each color enhancement model in the color enhancement model pool, to obtain the video frame subjected to color adjustment output by each color enhancement model: a content analysis unit for processing the video frames based on a content analysis model, to generate a weight of each color enhancement model corresponding to the video frame, where the content analysis model is configured to determine a weight of each color enhancement model in the color enhancement model pool according to the video frame; and a fusion processing unit for performing weighted fusion processing on the video frame subjected to the color adjustment output by each color enhancement model, using the weight of each color enhancement model corresponding to the video frame, to generate the video output frame.

In some embodiments, the color enhancement model includes an image reconstruction branch model and a color enhancement branch model. The model processing unit may specifically include: an extraction sub-unit for performing feature extraction on the video frame, to obtain a first image feature: a filter sub-unit for filtering the video frame and performing feature extraction on the filtered video frame, to obtain a second image feature: a branch model processing sub-unit for inputting the first image feature into the image reconstruction branch model, inputting the second image feature into the color enhancement branch model, to perform image reconstruction and color adjustment according to the first image feature and the second image feature: a result fusion sub-unit for performing feature fusion processing on the output result of the image reconstruction branch model and the output result of the color enhancement branch model, to obtain a fusion result; and a result generating sub-unit for generating the video output frame subjected to color adjustment, according to the fusion result.

In some embodiments, the image reconstruction branch model and the color enhancement branch model each include N number of residual dense blocks RDBs; and the color enhancement model further includes N number of fully connected layers: where N is an integer greater than or equal to 1. The branch model processing sub-unit is specifically used to: acquiring a first RDB in the image reconstruction branch model and a first RDB in the color enhancement branch model as a current RDB of a first branch model and a current RDB of a second branch model, respectively: processing the first image feature through the current RDB of the first branch model, and processing the second image feature through the current RDB of a second branch model, to obtain a feature map output by the current RDB of the first branch model and a low frequency color feature output by the current RDB of the second branch model: processing the low frequency color feature output by the current RDB of the second branch model through a fully connected layer, to obtain a feature vector, and correspondingly multiplying the feature vector by the feature map output by the current RDB of the first branch model, to obtain a feature map subjected to local color feature adjustment: taking the feature map subjected to the local color feature adjustment as a new first image feature, and taking the low frequency color feature output by the current RDB of the second branch model as a new second image feature; and acquiring a next RDB in the image reconstruction branch model and a next RDB in the color enhancement branch model as a new current RDB of the first branch model and a new current RDB of the second branch model, respectively, until the number of acquiring times is equal to N, taking the newly acquired feature map subjected to local adjustment on the color feature as an output result of the image reconstruction branch model, and taking the newly acquired low frequency color feature as an output result of the color enhancement branch model.

In some embodiments, the RDB includes a DenseNet and a local feature fusion layer. The local feature fusion layer is used for performing feature addition on the input feature to the RDB and the output feature of the DenseNet using local residual learning, to obtain the output feature of the RDB. The DenseNet includes M number of dense blocks and one connection block, where M is an integer greater than or equal to 1. An input to the first dense block is the input feature to the RDB; and an input feature to the $i^{th}$ dense block is the input feature to the RDB and the output features of all dense blocks before the $i^{th}$ dense block, where i is an integer greater than 1 and less than or equal to M. An input to the connection block is the input feature to the RDB and the output features of the dense blocks.

In some embodiments, each color enhancement model in the color enhancement model pool has the same model structure. The color enhancement model in the color enhancement model pool is a trained color enhancement model obtained through pre-training an initial color enhancement model by adopting different color enhancement data pairs for different color styles of different video content types. The color enhancement data pair includes an un-toned image block and a toned image block with a same image size, which are selected from an un-toned image and a first toned image, respectively, at a same position in image, where the first toned image is an image pre-acquired by toning the un-toned image based on the color style characteristics of the image.

In some embodiments, the video processing apparatus 1000 further includes a color enhancement model training module for training an initial color enhancement model. The color enhancement training module includes: a first adjustment result obtaining unit for processing an un-toned image block selected from the un-toned image using an initial color enhancement model, to obtain a color adjustment result of the un-toned image block: a first reference result acquiring unit for acquiring a toned image block corresponding to the un-toned image block from the color enhancement data pair, as a color adjustment reference result: a first loss function construction unit for constructing a loss function of the initial color enhancement model based on the color adjustment result and the color adjustment reference result: a first parameter adjusting unit for adjusting the model parameters of the initial color enhancement model using the loss function of the initial color enhancement model, to obtain an updated color enhancement model; and a first iterative training unit for taking the updated color enhancement model as a new initial color enhancement model, and processing the un-toned image block selected from the un-toned image using the new initial color enhancement model, until the training process of the initial color enhancement model meets a first training end condition, to obtain the trained color enhancement model, where the first training end condition includes at least one of the following conditions that a training loss calculated according to the loss function of the initial color enhancement model is less than or equal to a set first loss threshold, or the number of training times of the initial color enhancement model reaches a set first threshold of number of times.

In some embodiments, when the color enhancement training module is used for constructing the loss function of the initial color enhancement model based on the color adjustment result and the color adjustment reference result, the color enhancement training module is specifically used for calculating a minimum square error between the color adjustment result and the color adjustment reference result, to obtain a minimum square error loss; calculating a Gaussian filter output result of the color adjustment result and a Gaussian filter output result of the color adjustment reference result, to obtain the color loss; and performing weighted summation on the minimized square error loss and the color loss, to generate the loss function of the initial color enhancement model.

In some embodiments, the content analysis model includes a convolutional network of K number of stacked convolutional structures connected in sequence and two fully connected layers. Each of the preceding K–1 number of stacked convolutional structures includes a convolutional layer, an activation layer and a pooling layer. The $K^{th}$ stacked convolutional structure includes a convolutional layer and an activation layer.

In some embodiments, the content analysis model is a trained content analysis model obtained by training an initial content analysis model based on each color enhancement model in a pre-trained color enhancement model pool and using image data pairs of different styles. The image data pair includes an un-toned image block and a toned image block with a same image size, which are selected from an un-toned image and a second toned image, respectively, at a same position in image, where the second toned image is an image pre-acquired by toning the un-toned image based on different video content types.

In some embodiments, the video processing apparatus 1000 further includes a content analysis model training module for training an initial content analysis model. The content analysis model training module includes: a second adjustment result obtaining unit for processing the un-toned image block selected from the un-toned image using each color enhancement model in a pre-trained color enhancement model pool, to obtain the color adjustment result of each color enhancement model on the un-toned image block; a weight obtaining unit for processing the un-toned image block using the initial content analysis model, to obtain a predetermined number of weights, where the predetermined number is the same as the number of color enhancement models in the color enhancement model pool; an enhancement result obtaining unit for performing weighting fusion processing on the color adjustment result of each color enhancement model on the un-toned image block, according to the predetermined number of weights, to obtain the color enhancement result of the un-toned image block; a second reference result acquiring unit for acquiring a toned image block corresponding to the un-toned image block from the image data pair, as the color enhancement reference result; a second loss function construction unit for constructing a loss function of the initial content analysis model based on the color enhancement result and the color enhancement reference result of the un-toned image block; a second parameter adjusting unit for adjusting the model parameters of the initial content analysis model using the loss function of the initial content analysis model, to obtain an updated content analysis model; and a second iterative training unit for taking the updated content analysis model as a new initial content analysis model, and processing the un-toned image block using the new initial content analysis model, until the training process of the initial content analysis model meets a second training end condition, to obtain the trained content analysis model, where the second training end condition includes at least one of the following conditions that a training loss calculated according to the loss function of the initial content analysis model is less than or equal to a set second loss threshold, or the number of training times of the initial content analysis model reaches a set second threshold of number of times.

In some embodiments, the loss function of the initial content analysis model is a loss function constructed from the minimized square error of the color enhancement result of the un-toned image block and the color enhancement reference result.

According to the video processing apparatus in the embodiment of the present disclosure, the input video frame may be processed using the color enhancement model and the content analysis model in the color enhancement model pool, so that each color enhancement model in the color enhancement model pool is assigned a weight, according to the weight corresponding to each color enhancement model in the color enhancement model pool output by the content analysis model. Finally, a color adjustment result obtained by performing weighted fusion on the processing results of all the color enhancement models in the color enhancement model pool is output, and the color adjustment result is based on the analysis on the video content type of the video to be processed, so that a video color adjustment result better conforming to the video content type is obtained, thereby automatically adjusting the video to be processed based on the weights assigned by the content analysis model, meeting the requirement on color style of the corresponding video content type, and improving the data processing efficiency of the video color adjustment.

It is to be understood that the present disclosure is not limited to the particular configurations and processes described in the above embodiments and illustrated in the figures. For convenience and simplicity of description, detailed description of a known method is omitted herein, and for the specific working processes of the system, the module and the unit described above, reference may be made to corresponding processes in the foregoing method embodiments, which are not repeated herein.

Figure 11:
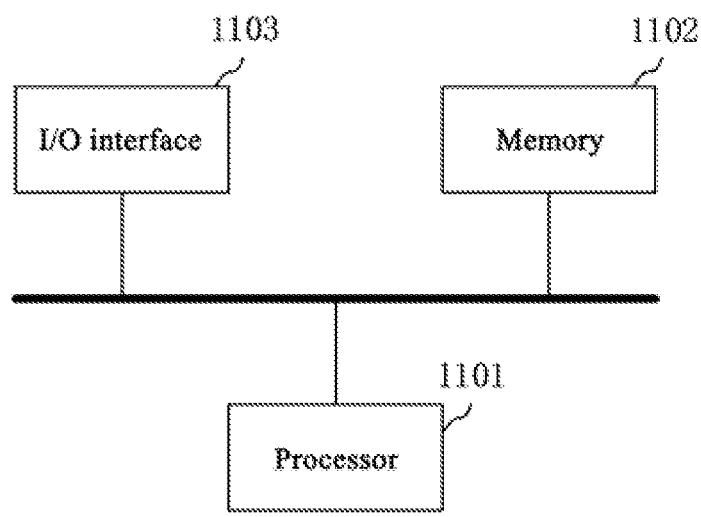
FIG. 11 is a block diagram of an electronic device implementing a video processing method in an embodiment of the present disclosure.

FIG. 11 is a block diagram of an electronic device in an embodiment of the present disclosure.

Referring to FIG. 11, an embodiment of the present disclosure provides an electronic device including: at least one processor 1101; at least one memory 1102, and one or more I/O interfaces 1103 connected between the processor 1101 and the memory 1102. The memory 1102 stores one or more computer programs that may be executable by the at least one processor 1101. The one or more computer programs are executed by the at least one processor 1101, so that the at least one processor 1101 can perform the video processing method described above.

It will be understood that the above embodiments are merely exemplary embodiments adopted to illustrate the principles of the present disclosure, and the present disclosure is not limited thereto. It will be apparent to one of ordinary skill in the art that various changes and modifications can be made without departing from the spirit and scope of the present disclosure, and these changes and modifications are to be considered within the scope of the present disclosure.

An embodiment of the present disclosure further provide a computer-readable storage medium with a computer program stored thereon, when executed by a processor/processing core, the computer program implements the video processing method described above. The computer-readable storage medium may be a volatile or non-volatile computer-readable storage medium.

An embodiment of the present disclosure further provide a computer program product, which includes computer-readable code or a non-volatile computer-readable storage medium carrying the computer-readable code. When the computer-readable code runs in a processor of an electronic device, the processor in the electronic device executes the video processing method described above.

It will be understood by one of ordinary skill in the art that all or some of the steps of the methods, function modules/units in the systems or apparatus disclosed above may be implemented as software, firmware, hardware, or suitable combinations thereof. In a hardware implementation, a division between the function modules/units mentioned in the above description does not necessarily correspond to a division of physical components. For example, one physical component may have a plurality of functions, or one function or step may be performed by several physical components in cooperation. Some or all of the physical components may be implemented as software executed by a processor, such as a central processing unit, digital signal processor, or microprocessor, or as hardware, or as an integrated circuit, such as an application specific integrated circuit. Such software may be distributed on a computer-readable storage medium, which may include a computer storage medium (a non-transitory medium) and a communication medium (a transitory medium).

As is well known to one of ordinary skill in the art, the term "computer storage medium" includes volatile and nonvolatile, removable and non-removable media implemented in any method or technology for storage of information (such as computer-readable program instructions, data structures, program modules or other data). The computer storage medium includes, but is not limited to, random access memory (RAM), read-only memory (ROM), erasable programmable read-only memory (EPROM), static random access memory (SRAM), flash memory or other memory technologies, portable compact disc read-only memory (CD-ROM), digital versatile disc (DVD) or other optical disk storage, magnetic cassette, magnetic tape, magnetic disk storage or other magnetic storage apparatuses, or any other medium which can be used to store the desired information and can be accessed by a computer. In addition, as is well known to one of ordinary skill in the art, the communication medium typically contains computer-readable program instructions, data structures, program modules or other data in a modulated data signal such as a carrier wave or other transport mechanism, and includes any information delivery medium.

The computer-readable program instructions described herein may be downloaded from a computer-readable storage medium to a respective computing/processing device, or to an external computer or external storage device through a network, such as the internet, a local area network, a wide area network, and/or a wireless network. The network may include copper transmission cables, fiber optic transmission, wireless transmission, routers, firewalls, switches, gateway computers and/or edge servers. The network adapter card or network interface in each computing/processing device receives the computer-readable program instructions from the network and forwards the computer-readable program instructions for storage in a computer-readable storage medium in the respective computing/processing device.

Computer program instructions for executing operations of the present disclosure may be assembler instructions, instruction set architecture (ISA) instructions, machine instructions, machine-related instructions, microcode, firmware instructions, state setting data, or source or object code written in any combination of one or more programming languages, including an object oriented programming language such as Smalltalk, C++ or the like and a conventional procedural programming language, such as "C" programming language or a similar programming language. The computer-readable program instructions may execute entirely on the user's computer, partly on the user's computer, as a stand-alone software package, partly on the user's computer and partly on a remote computer, or entirely on the remote computer or server. In a case involving the remote computer, the remote computer may be connected to the user's computer through any type of network, including a local area network (LAN) or a wide area network (WAN), or connected to an external computer (for example, through the internet provided by an internet service provider). In some embodiments, various aspects of the present disclosure are implemented by personalizing an electronic circuit, which can execute the computer-readable program instructions, such as a programmable logic circuit, a field programmable gate array (FPGA), or a programmable logic array (PLA), by means of state information of the computer-readable program instructions.

The computer program product described herein may be embodied in hardware, software, or a combination thereof. In an alternative embodiment, the computer program product is embodied in a computer storage medium. In another alternative embodiment, the computer program product is embodied in a software product, such as a software development kit (SDK) or the like.

Various aspects of the present disclosure are described herein with reference to flowcharts and/or block diagrams of methods, apparatus (systems) and computer program products according to the embodiments of the present disclosure.

It will be understood that each block in the flowchart and/or the block diagram, and combinations of blocks in the flowchart and/or the block diagram, can be implemented by computer-readable program instructions.

These computer-readable program instructions may be provided to a processor of a general purposed computer, a special purposed computer, or other programmable data processing apparatus to produce a machine, such that the instructions, when executed by the processor of the computer or other programmable data processing apparatus, create an apparatus implementing the functions/acts specified in one or more blocks in the flowchart and/or the block diagram. These computer-readable program instructions may alternatively be stored in a computer-readable storage medium, and theses instructions can direct a computer, programmable data processing apparatus, and/or other devices to function in a particular manner, such that the computer-readable medium storing the instructions includes a manufacture including instructions which implement various aspects of the functions/acts specified in one or more blocks in the flowchart and/or the block diagram.

The computer-readable program instructions may alternatively be loaded onto a computer, other programmable data processing apparatuses, or other devices to execute a series of operation steps on the computer, other programmable data processing apparatuses or other devices, to produce a computer implemented process, such that the instructions which are executed on the computer, other programmable data processing apparatuses or other devices implement the functions/acts specified in one or more blocks the flowchart and/or the block diagram.

The flowcharts and the block diagrams in the drawings illustrate architecture, functionality, and operation of possible implementations of systems, methods and computer program products according to various embodiments of the present disclosure. In this regard, each block in the flowchart or the block diagram may represent a module, a program segment, or a portion of instructions, which includes one or more executable instructions for implementing the specified logical function(s). In some alternative implementations, the functions noted in the block may occur in an order different from that noted in the figure. For example, two blocks shown in succession may, in fact, be executed substantially concurrently, or the blocks may sometimes be executed in the reverse order, depending upon the functionality involved. It should also be noted that each block in the block diagram and/or the flowchart, and combinations of blocks in the block diagram and/or the flowchart, may be implemented by a hardware-based system of a special purpose that executes the specified functions or acts, or implemented by a combination of a special purposed hardware and the computer instructions.

Example embodiments have been disclosed herein, and although specific terms are employed, they are used and should be interpreted in a generic and descriptive sense only and not for purposes of limitation. In some instances, as is apparent to one of ordinary skill in the art, features, characteristics and/or units described in connection with a particular embodiment may be used alone or in combination with features, characteristics and/or units described in connection with other embodiments, unless expressly stated otherwise. Therefore, it will be understood by one of ordinary skill in the art that various changes in form and details may be made without departing from the scope of the present disclosure as set forth in the appended claims.

What is claimed is:

1. A computer-implemented video processing method, comprising:
   acquiring a video frame of a video to be processed;
   performing color adjustment on the video frame using at least one color enhancement model in a color enhancement model pool, to obtain an video output frame subjected to color adjustment; and
   playing the video output frame subjected to color adjustment on an ultra-high definition display platform,
   wherein the color enhancement model pool comprises a set of models for performing the color adjustment on videos of a plurality of video content types with different requirements on styles thereof,
   wherein each color enhancement model in the color enhancement model pool has a same model structure;
   the color enhancement model in the color enhancement model pool is a trained color enhancement model obtained through pre-training an initial color enhancement model by adopting different color enhancement data pairs for different color styles of different video content types; and
   the color enhancement data pair comprises: an un-toned image block and a toned image block with a same image size, selected from an un-toned image and a first toned image, respectively, at a same position in image, wherein the first toned image is an image pre-acquired by toning the un-toned image based on the color style characteristics of the un-toned image.

2. The computer-implemented video processing method according to claim 1, wherein the performing color adjustment on the video frame using at least one color enhancement model in a color enhancement model pool, to obtain an video output frame subjected to color adjustment, comprises:
   receiving information comprising the video content type and the requirement on style of the video frame;
   selecting a color enhancement model corresponding to the video content type and the requirement on style from the color enhancement model pool; and
   processing the video frame using the selected color enhancement model, to obtain the video output frame subjected to color adjustment.

3. The computer-implemented video processing method according to claim 1, wherein the performing color adjustment on the video frame using at least one color enhancement model in a color enhancement model pool, to obtain an video output frame subjected to color adjustment, comprises:
   processing the video frame using each color enhancement model in the color enhancement model pool, to obtain the video frame subjected to color adjustment output by this color enhancement model;
   processing the video frame based on a content analysis model, to generate a weight of each color enhancement model corresponding to the video frame; wherein the content analysis model is configured to determine a weight of each color enhancement model in the color enhancement model pool according to the video frame; and
   performing weighted fusion processing on the video frames subjected to color adjustment output by all the color enhancement models, using the weights of all the color enhancement models corresponding to the video frame, to generate the video output frame.

4. The computer-implemented video processing method according to claim 2, wherein the color enhancement model comprises an image reconstruction branch model and a color enhancement branch model; and the processing the video frame using the selected color enhancement model, to obtain the video output frame subjected to color adjustment, comprises:

performing feature extraction on the video frame, to obtain a first image feature;

filtering the video frame, and performing feature extraction on the filtered video frame, to obtain a second image feature;

inputting the first image feature into the image reconstruction branch model, and inputting the second image feature into the color enhancement branch model, to perform image reconstruction and color adjustment according to the first image feature and the second image feature;

performing feature fusion processing on an output result of the image reconstruction branch model and an output result of the color enhancement branch model, to obtain a fusion result; and generating the video output frame subjected to color adjustment, according to the fusion result.

5. The computer-implemented video processing method according to claim 4, wherein each of the image reconstruction branch model and the color enhancement branch model comprises N number of residual dense blocks (RDBs); the color enhancement model further comprises N number of fully connected layers; wherein N is an integer greater than or equal to 1; and the inputting the first image feature into the image reconstruction branch model, and inputting the second image feature into the color enhancement branch model, to perform image reconstruction and color adjustment according to the first image feature and the second image feature, comprises:

acquiring a first RDB in the image reconstruction branch model and a first RDB in the color enhancement branch model, as a current RDB of a first branch model and a current RDB of a second branch model, respectively;

processing the first image feature through the current RDB of the first branch model, and processing the second image feature through the current RDB of the second branch model, to obtain a feature map output by the current RDB of the first branch model and a low frequency color feature output by the current RDB of the second branch model;

processing the low frequency color feature output by the current RDB of the second branch model through a corresponding one of the N number of fully connected layers, to obtain a feature vector, and correspondingly multiplying the feature vector by the feature map output by the current RDB of the first branch model, to obtain a feature map subjected to local color feature adjustment;

taking the feature map subjected to local color feature adjustment as a new first image feature, and taking the low frequency color feature output by the current RDB of the second branch model as a new second image feature; and acquiring a next RDB in the image reconstruction branch model and a next RDB in the color enhancement branch model as a new current RDB of the first branch model and a new current RDB of the second branch model, respectively, until the number of acquiring times is equal to N, taking a newly obtained feature map subjected to local color feature adjustment as an output result of the image reconstruction branch model, and taking the newly acquired low frequency color feature as an output result of the color enhancement branch model.

6. The computer-implemented video processing method according to claim 5, wherein the RDB comprises a DenseNet and a local feature fusion layer;

the local feature fusion layer is configured to perform feature addition on an input feature to the RDB and an output feature of the DenseNet using local residual learning, to obtain an output feature of the RDB;

the DenseNet comprises M number of dense blocks and one connection block, wherein M is an integer greater than or equal to 1; wherein an input to a first dense block is the input feature to the RDB;

an input feature to the $i^{th}$ dense block is the input feature to the RDB and output features of all dense blocks before the $i^{th}$ dense block, wherein i is an integer greater than 1 and less than or equal to M; and an input to the connection block is the input feature to the RDB and the output features of the M number of dense blocks.

7. The computer-implemented video processing method according to claim 1, wherein training the initial color enhancement model comprises:

processing the un-toned image block selected from the un-toned image using the initial color enhancement model, to obtain a color adjustment result of the un-toned image block, and acquiring a toned image block corresponding to the un-toned image block from the color enhancement data pair, as a color adjustment reference result;

constructing a loss function of the initial color enhancement model based on the color adjustment result and the color adjustment reference result;

adjusting model parameters of the initial color enhancement model using the loss function of the initial color enhancement model, to obtain an updated color enhancement model; and taking the updated color enhancement model as a new initial color enhancement model, and processing the un-toned image block selected from the un-toned image using the new initial color enhancement model, until the training process of the initial color enhancement model meets a first training end condition, to obtain the trained color enhancement model; wherein the first training end condition comprises at least one of the following conditions that a training loss calculated according to the loss function of the initial color enhancement model is less than or equal to a set first loss threshold, or the number of training times of the initial color enhancement model reaches a set first threshold of number of times.

8. The computer-implemented video processing method according to claim 7, wherein the constructing a loss function of the initial color enhancement model based on the color adjustment result and the color adjustment reference result, comprises:

calculating a minimum square error between the color adjustment result and the color adjustment reference result, to obtain a minimum square error loss;

calculating a Gaussian filter output result of the color adjustment result and a Gaussian filter output result of the color adjustment reference result, to obtain a color loss; and performing weighted summation on the minimized square error loss and the color loss, to generate the loss function of the initial color enhancement model.

9. The computer-implemented video processing method according to claim 3, wherein the content analysis model comprises a convolutional network of K number of stacked convolutional structures connected in sequence and two fully connected layers, each of preceding K−1 number of stacked convolutional structures comprises a convolutional layer, an activation layer and a pooling layer, and a $K^{th}$ stacked convolutional structure comprises a convolutional layer and an activation layer.

10. The computer-implemented video processing method according to claim 3, wherein
the content analysis model is a trained content analysis model obtained by training an initial content analysis model based on each color enhancement model in a pre-trained color enhancement model pool and using image data pairs of different styles; wherein
the image data pair comprises an un-toned image block and a toned image block with a same image size, selected from the un-toned image and a second toned image, respectively, at a same position in image, wherein the second toned image is an image pre-acquired by toning the un-toned image based on different video content types.

11. The computer-implemented video processing method according to claim 10, wherein the training the initial content analysis model, comprises:
processing the un-toned image block selected from the un-toned image using each color enhancement model in a pre-trained color enhancement model pool, to obtain a color adjustment result of each color enhancement model on the un-toned image block;
processing the un-toned image block using the initial content analysis model, to obtain a predetermined number of weights, wherein the predetermined number is the same as the number of the color enhancement models in the color enhancement model pool;
performing weighted fusion processing on the color adjustment results of all the color enhancement models on the un-toned image block, according to the predetermined number of weights, to obtain a color enhancement result of the un-toned image block, and acquiring the toned image block corresponding to the un-toned image block from the image data pair, as a color enhancement reference result;
constructing a loss function of the initial content analysis model based on the color enhancement result and the color enhancement reference result of the un-toned image block;
adjusting model parameters of the content analysis model using the loss function of the initial content analysis model, to obtain an updated content analysis model using the adjusted model parameters; and
taking the updated content analysis model as a new initial content analysis model, and processing the un-toned image block using the new initial content analysis model, until the training process of the initial content analysis model meets a second training end condition, to obtain the trained content analysis model,
wherein the second training end condition comprises at least one of the following conditions that a training loss calculated according to the loss function of the initial content analysis model is less than or equal to a set second loss threshold, or the number of training times of the initial content analysis model reaches a set second threshold of number of times.

12. The computer-implemented video processing method according to claim 11, wherein
the loss function of the initial content analysis model is a loss function constructed according to the minimized square error of the color enhancement result of the un-toned image block and the color enhancement reference result.

13. An electronic device, comprising a processor and a memory storing a computer program which, when being executed by the processor, implements the computer-implemented video processing method according to claim 1.

14. A non-transitory computer readable storage medium storing a computer program which, when being executed by a processor, implements the computer-implemented video processing method according to claim 1.

15. The computer-implemented video processing method according to claim 9, wherein
the content analysis model is a trained content analysis model obtained by training an initial content analysis model based on each color enhancement model in a pre-trained color enhancement model pool and using image data pairs of different styles; wherein
the image data pair comprises an un-toned image block and a toned image block with a same image size, selected from the un-toned image and a second toned image, respectively, at a same position in image, wherein the second toned image is an image pre-acquired by toning the un-toned image based on different video content types.

16. The computer-implemented video processing method according to claim 15, wherein the training the initial content analysis model, comprises:
processing the un-toned image block selected from the un-toned image using each color enhancement model in a pre-trained color enhancement model pool, to obtain a color adjustment result of each color enhancement model on the un-toned image block;
processing the un-toned image block using the initial content analysis model, to obtain a predetermined number of weights, wherein the predetermined number is the same as the number of the color enhancement models in the color enhancement model pool;
performing weighted fusion processing on the color adjustment results of all the color enhancement models on the un-toned image block, according to the predetermined number of weights, to obtain a color enhancement result of the un-toned image block, and acquiring the toned image block corresponding to the un-toned image block from the image data pair, as a color enhancement reference result;
constructing a loss function of the initial content analysis model based on the color enhancement result and the color enhancement reference result of the un-toned image block;
adjusting model parameters of the content analysis model using the loss function of the initial content analysis model, to obtain an updated content analysis model using the adjusted model parameters; and
taking the updated content analysis model as a new initial content analysis model, and processing the un-toned image block using the new initial content analysis model, until the training process of the initial content analysis model meets a second training end condition, to obtain the trained content analysis model, wherein the second training end condition comprises at least one of the following conditions that a training loss calculated according to the loss function of the initial content analysis model is less than or equal to a set second loss threshold, or the number of training times of the initial content analysis model reaches a set second threshold of number of times.

17. The computer-implemented video processing method according to claim 16, wherein the loss function of the initial content analysis model is a loss function constructed according to the minimized square error of the color enhancement result of the un-toned image block and the color enhancement reference result.

18. An electronic device, comprising a processor and a memory storing a computer program which, when being executed by the processor, implements the computer-implemented video processing method according to claim 2.

19. A computer-implemented video processing apparatus, comprising:

an acquisition device configured to acquire a video frame to be processed;

a processing device configured to performing color adjustment on the video frame using at least one color enhancement model in a color enhancement model pool, to obtain an video output frame subjected to color adjustment; and an ultra-high definition display platform configured to play the video output frame subjected to color adjustment, wherein the color enhancement model pool comprises a set of models for performing the color adjustment on videos of a plurality of video content types with different requirements on styles thereof, wherein each color enhancement model in the color enhancement model pool has a same model structure;

the color enhancement model in the color enhancement model pool is a trained color enhancement model obtained through pre-training an initial color enhancement model by adopting different color enhancement data pairs for different color styles of different video content types; and the color enhancement data pair comprises: an un-toned image block and a toned image block with a same image size, selected from an un-toned image and a first toned image, respectively, at a same position in image, wherein the first toned image is an image pre-acquired by toning the un-toned image based on the color style characteristics of the un-toned image.

* * * * *